US010204168B2

United States Patent
Parker et al.

(10) Patent No.: US 10,204,168 B2
(45) Date of Patent: Feb. 12, 2019

(54) SYSTEMS AND METHODS FOR AUTOMATICALLY IDENTIFYING AND LINKING NAMES IN DIGITAL RESOURCES

(71) Applicant: NAMESFORLIFE, LLC, East Lansing, MI (US)

(72) Inventors: Charles T. Parker, East Lansing, MI (US); Catherine M. Lyons, Edinburgh (GB); Gerald P. Roston, Saline, MI (US); George M. Garrity, Okemos, MI (US)

(73) Assignee: NAMESFORLIFE, LLC, East Lansing, MI (US)

( * ) Notice: Subject to any disclaimer, the term of this patent is extended or adjusted under 35 U.S.C. 154(b) by 0 days.

(21) Appl. No.: 15/615,171

(22) Filed: Jun. 6, 2017

(65) Prior Publication Data

US 2017/0337290 A1   Nov. 23, 2017

Related U.S. Application Data

(63) Continuation of application No. 12/685,964, filed on Jan. 12, 2010, now Pat. No. 9,672,293.

(60) Provisional application No. 61/143,986, filed on Jan. 12, 2009, provisional application No. 61/184,187, filed on Jun. 4, 2009.

(51) Int. Cl.
*G06F 17/30* (2006.01)

(52) U.S. Cl.
CPC .. *G06F 17/30887* (2013.01); *G06F 17/30864* (2013.01)

(58) Field of Classification Search
CPC ................... G06F 17/30864; G06F 17/30887
USPC ......................................................... 707/750
See application file for complete search history.

(56) References Cited

U.S. PATENT DOCUMENTS

| | | | |
|---|---|---|---|
| 7,925,444 B2* | 4/2011 | Garrity | G06Q 10/00 702/19 |
| 2003/0167283 A1* | 9/2003 | Remsen | G06F 17/30882 707/805 |
| 2004/0098271 A1* | 5/2004 | Hicks | G06Q 10/06375 705/7.31 |
| 2005/0149269 A1* | 7/2005 | Thomas | G06F 19/28 702/19 |
| 2005/0160059 A1* | 7/2005 | Garrity | G06F 17/30876 707/669 |
| 2006/0080314 A1* | 4/2006 | Hubert | G06F 17/30011 707/713 |
| 2006/0206512 A1* | 9/2006 | Hanrahan | G06F 17/30554 707/802 |
| 2007/0180388 A1* | 8/2007 | Izhikevich | G06F 17/30861 715/751 |
| 2011/0066968 A1* | 3/2011 | Goldsmith | G06F 19/325 715/781 |

* cited by examiner

*Primary Examiner* — Shahid A Alam
(74) *Attorney, Agent, or Firm* — Casimir Jones, S.C.

(57) ABSTRACT

The present invention provides systems and methods for automatically identifying name-like-strings in digital resources, matching these name-like-string against a set of names held in an expertly curated database, and for those name-like-strings found in said database, enhancing the content by associating additional matter with the name, wherein said matter includes information about the names that is held within said database and pointers to other digital resources which include the same name and it synonyms.

11 Claims, 23 Drawing Sheets

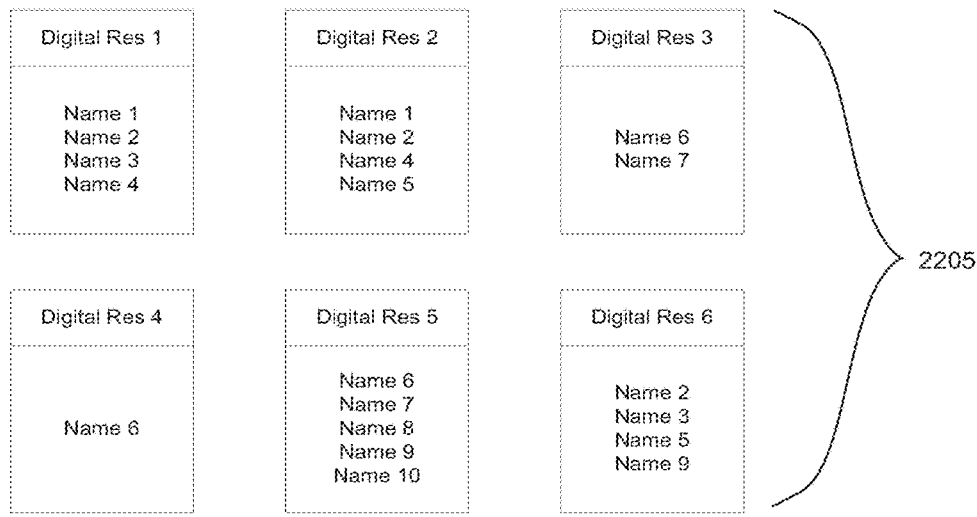
FIG. 22A
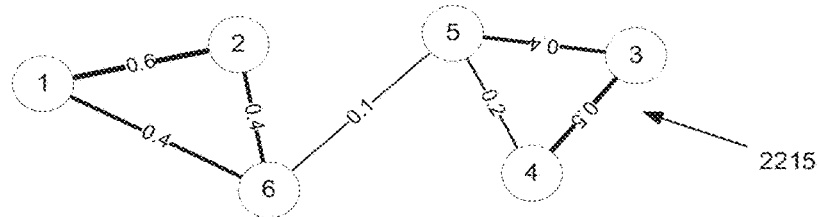
FIG. 22B
FIG. 22C

SYSTEMS AND METHODS FOR AUTOMATICALLY IDENTIFYING AND LINKING NAMES IN DIGITAL RESOURCES

CROSS-REFERENCE TO RELATED APPLICATIONS

This application is a Continuation of and claims the benefit of U.S. Non-Provisional application Ser. No. 12/685,964, filed Jan. 12, 2010, now U.S. Pat. No. 9,672,293, issued Jun. 6, 2017, which claims the benefit of U.S. Provisional Application No. 61/143,986, filed Jan. 12, 2009, and U.S. Provisional Application No. 61/184,187, filed Jun. 4, 2009, each of which are incorporated herein by reference in their entireties.

STATEMENT REGARDING FEDERALLY SPONSORED RESEARCH OR DEVELOPMENT

This invention was made with government support under STTR contract number DE-FG02-07ER86321 awarded by Department of Energy. The United States government has certain rights in the invention.

FIELD OF THE INVENTION

The present invention relates to systems and methods for automatically identifying and tagging name-like-strings in digital resources.

BACKGROUND OF THE INVENTION

Using biological entities as an example, it is known that the simple act of naming an entity, which is part of a large, complex classification or taxonomic system, has potentially far-reaching and long-lived consequences. For example, those names ascribed to organisms serve as a primary entry point into the scientific, medical, and technical literature and figure prominently in countless laws and regulations governing various aspects of commerce, public safety and public health. Biological names also serve as a primary entry point into many of the central databases that the scientific community and the general public rely on. While legalistic Codes of Nomenclature exist that govern the formation, assignment, and usage of names to biological taxa, the process of biological classification is not governed by these Codes of Nomenclature. Taxonomies represent the scientific opinions of the individuals who create them, and may be of varying quality or consistency. Hence, legitimate and valid names may be ascribed to poorly-formed taxa and illegitimate and invalid names may be assigned to well-formed and/or correctly identified taxa. Moreover, biological names are neither unique nor permanent. A single organism can bear multiple names (synonyms) that represent differing taxonomic opinions that may have been rendered either in sequence or in parallel. Instances of homonymy also occur, in which a single name may refer to more than one group of organisms that are of markedly different evolutionary lineages (e.g. the genus name *Bacillus* applies to bacteria and insects). Orthographic variants may also occur, arising from correction of nomenclatural errors.

Those whose work involves bacteria, from research scientists and clinicians to public officials and bioterrorism experts, face an ever-growing list of names for everything from whole organisms to individual genes, proteins, and sub-cellular components. While many bacteria are harmless and others can be beneficial, some are the causative agents of potentially lethal diseases. Knowing which is which requires reasoned judgment and on-demand access to the correct information, information that is typically accessed using a scientific name. With rapid advances in knowledge of the depth and breadth of bacterial diversity, the list of names not only grows, it also undergoes incremental redefinition on a daily basis.

While these additions and name changes are of considerable interest to a relatively small number of experts engrossed in bacterial classification, they present a significant problem to both end-users and information providers, who must invest a significant and increasing effort to make the connections between new names to names in publications that predate any change. Failure to maintain name currency may prevent scientists and non-scientists alike from tracking important developments in their field and may trigger inappropriate or life-threatening responses.

Simply put, the continual rapid change in the nomenclature of bacteria has outstripped the ability of most end-users, information providers, and device manufacturers to keep pace. What is needed is a bacterial name-lookup service that permits on-demand access to the correct information at the point of need, regardless of the name that is used. Ideally, that same service would provide a means of synchronizing updates across the entire field, in the scientific literature and databases, in diagnostic instruments, and wherever else bacterial names must be resolved.

The disjunction between nomenclature and taxonomy leads to an accumulation of dubious names in the literature and databases. While experts in taxonomy and biological nomenclature may be able to recognize and correctly interpret such circumstances, few others have the requisite skills to do so, resulting in frequent misapplication of names and misinterpretation of the taxonomic record. From a practical, legal, or regulatory sense, either incorrect nomenclature or errors in classification or identification can have significant and unintended consequences. For example, these errors may lead to the addition or removal of biological species from lists of tightly-regulated organisms such as those appearing on the CDC list of Restricted Select Agents, those governed by the USDA APHIS program, those covered by the Endangered Species Act, or those restricted by packaging and shipping regulations maintained by the USPS, DOT and various international bodies such as the International Airline Transport Association (IATA). The use of biological names as a means of information retrieval is not reliable as these names are neither unique nor persistent.

The present invention provides systems and methods for automatically enabling digital resources, based on an underlying information architecture, as well as a means of accessing data related to those entities in a networked environment using persistent, globally unique identifiers.

The invention enables efficient mining of enormous amounts of biological literature and annotations relevant to a particular organism, even if the organism has undergone multiple taxonomic re-classifications and renaming. This will prevent the introduction of errors related to semantic inconsistencies as well as loss of information. The present invention "future-proofs" those products to which it is applied by providing a method of persistently linking biological names or other terms found in published content to the expertly managed information about the origins, definition, and current usage of those terms. The present invention can also serve as a fine-grained marketing tool by establishing persistent links between terms and related products for sale. The present invention provides services which assure content providers that their offerings will always be accessible to their end-users and eliminate the burden and costs of tracking and managing rapidly changing biological terminologies.

SUMMARY OF THE INVENTION

In one embodiment the invention is a software method which includes a stand-alone program that operates on prepublication materials, and in another embodiment a browser-based extension that operates on the content of a web-page. The invention also includes methods for generating revenue based on the additional matter used to enhance digital resources.

In another embodiment, the present invention provides systems and methods for automatically identifying name-like-strings in digital resources, matching these name-like-string against a set of names held in an expertly curated database, and for those name-like-strings found in said database, enhancing the content by associating additional matter with the name, wherein said matter includes information about the names that is held within said database and pointers to other digital resources which include the same name and its synonyms.

The invention allows rapid incorporation of changes to keep pace with advances in the field. In one embodiment, the invention uses technology which includes an underlying structure for classifying types of biological data; persistent identifiers for each term; and a database model based on the rules of biological nomenclature. In various embodiments the invention uses Digital Object Identifiers (DOT®), which guarantees that links are persistent, to act as surrogates for names and provide a direct path to the most current name. Along with each name, the invention in certain embodiments stores both attributes and methods associated with the name. The attributes may include specific information that is important for identifying the object, such as the date of discovery, the name of the discoverer, etc. The manner in which these objects are related to each other forms the basis for ensuring that the meaning of the objects remains consistent over time. A list of services, many of which can be monetized, may also be associated with the specific object. In the absence of the inventive technology and services, content providers would either have to bear the costs of updating their publications or information products manually at regular intervals or else risk a rapid decay in their investment.

In some embodiments, the invention provides a method for adding a tag to a digital resource. The method comprises finding within said digital resource at least one occurrence of a name-like-string, wherein said name-like-string is contained within a database, and said database relates said name-like-string to other name-like-strings by means of a taxonomic structure based on rules of nomenclature, and said database is expertly curated. A globally unique identifier is obtained from said database based upon said name-like-string. A tag comprising said identifier is inserted into said digital resource. The method may be implemented by a computer.

In this way, a plurality of related name-like-strings may be associated with a single globally unique identifier. As such, a plurality of digital resources including different, but related, name-like-strings maybe processed so that a common globally unique identifier is inserted into each of the plurality of digital resources. Where, for example, a single organism is identified using different name-like-strings in different resources, it is therefore possible to identify that the different name-like-strings identify the same organism by insertion of the globally unique identifier in each of the digital resources.

A method for adding a tag to a digital resource. The method includes finding within the digital resource at least one occurrence of a name-like-string, wherein the name-like-string is contained within a database. The database relates the name-like-string to other name-like-strings by means of a taxonomic structure based on rules of nomenclature, where the database is expertly curated. The method also includes obtaining from the database a globally unique identifier with the name-like-string and modifying the digital resource by inserting a tag with the identifier.

A method for adding content to a database of name-like-strings. The method includes finding within a digital resource at least one occurrence of a name-like-string, wherein the name-like-string is not contained within the database. The database relates the name-like-strings to other name-like-strings by means of a taxonomic structure based on rules of nomenclature, where the database is expertly curated. The method also includes having an expert ensure that the name-like-string is in fact a valid name and creating a new record within the database comprising the name-like-string, a content identifier, and named relations to other name-like-strings already within the database.

A method for providing information and services to End-Users from digital content having at least one content identifier embedded therein. The method includes accessing an expertly curated database which relates name-like-strings to other name-like-strings by means of a taxonomic structure based on rules of nomenclature and using the content identifier to obtain information about a related name-like-string existing in the digital content. The method also includes accessing a database which associates name-like-strings to services and information and using the content identifier to obtain the services and information about the related name-like-string existing in the digital content. The method further includes displaying information and providing a means for a user to select from the information displayed.

A computer program product including a computer usable medium having a computer readable program code embodied therein, where the computer readable program code is adapted to be executed to implement a method for adding tags to a first digital resource. The method includes creating a second digital resource which includes the content of the first digital resource and finding within the second digital resource at least one occurrence of a name-like-string, wherein the name-like-string is contained within a database, the database relates the name-like-string to other name-like-strings by means of a taxonomic structure based on rules of nomenclature, and the database is expertly curated. The method also includes obtaining from the database for the name-like-string a globally unique identifier associated with the string and inserting a tag with the identifier into the second digital resource.

A computer program product including a computer usable medium having a computer readable program code embodied therein, where the computer readable program code is adapted to be executed to implement a method for adding a tag to a digital resource. The method includes finding within the digital resource at least one occurrence of a name-like-string, wherein the name-like-string is contained within a database, the database relates the name-like-string to other name-like-strings by means of a taxonomic structure based on rules of nomenclature, and the database is expertly curated. The method also includes obtaining from the database a globally unique identifier uniquely associated with the name-like-string and modifying the digital resource by inserting a tag with the identifier.

A computer program product including a computer usable medium having a computer readable program code embodied therein, the computer readable program code adapted to be executed to implement a method for adding content to a database of name-like-strings. The method includes finding within a digital resource at least one occurrence of a name-like-string, wherein the name-like-string is not contained within the database, the database relates the name-like-strings to other name-like-strings by means of a taxonomic structure based on rules of nomenclature, and the database is expertly curated. The method also includes having an expert ensure that the name-like-string is in fact a valid name and creating a new record within the database comprising the name-like-string, a content identifier, and named relations to other name-like-strings already within the database.

A computer program product including a computer usable medium having a computer readable program code embodied therein, the computer readable program code adapted to be executed to implement a method for providing information and services to End-Users from digital content having at least one content identifier embedded therein. The method includes accessing an expertly curated database which relates name-like-strings to other name-like-strings by means of a taxonomic structure based on rules of nomenclature and using the content identifier to obtain information about a related name-like-string existing in the digital content. The method also includes accessing a database which associates name-like-strings to services and information and using the content identifier to obtain the services and information about the related name-like-string existing in the digital content. The method further includes displaying information and providing a means for a user to select from the information displayed.

A method for building a graph relating digital resources. The method includes calculating a distance between two digital resources using a mathematical formula that is based upon the number of occurrences of a name in each of the digital resources.

A method for tracking a number of occurrences of a name-like-string in a digital resource. The method includes counting a first number of occurrences of the name-like-string in a digital resource for a first time period, and calculating a first average and a first standard deviation of the first number of occurrences for the first time period.

A method for generating a visualization of taxonomic data. The method includes obtaining a selected name object and an ordering basis from a user; searching a database for name objects related to the selected name object; retrieving one or more related name objects from the database; extracting time-based publication information for the selected name object and each of the one or more related name objects retrieved from the database; and determining a relative arrangement of the selected name object and the one or more related name objects retrieved from the database using the ordering basis obtained from the user, thereby producing an ordered list of name objects. The method also includes generating a first output image comprising a graph, the graph including the selected name object and the one or more related name objects retrieved from the database, the graph further including a time-based axis, such that each of the selected and related name objects is represented on the graph by a first visual indicator which depicts the time-based publication information extracted for each respective name object; and presenting the first output image to the user.

DESCRIPTION OF THE DRAWINGS

The above, as well as other advantages of the present disclosure, will become readily apparent to those skilled in the art from the following detailed description, particularly when considered in the light of the drawings described herein.

FIG. 22 shows an example of building a graph to identify the relatedness of a set of digital resources.

FIG. 22A shows an example of six digital resources, each with names.

FIG. 22B shows the calculated distance between the example digital resources.

FIG. 22C shows a network diagram of the example digital resources.

DEFINITIONS

Figure 1:
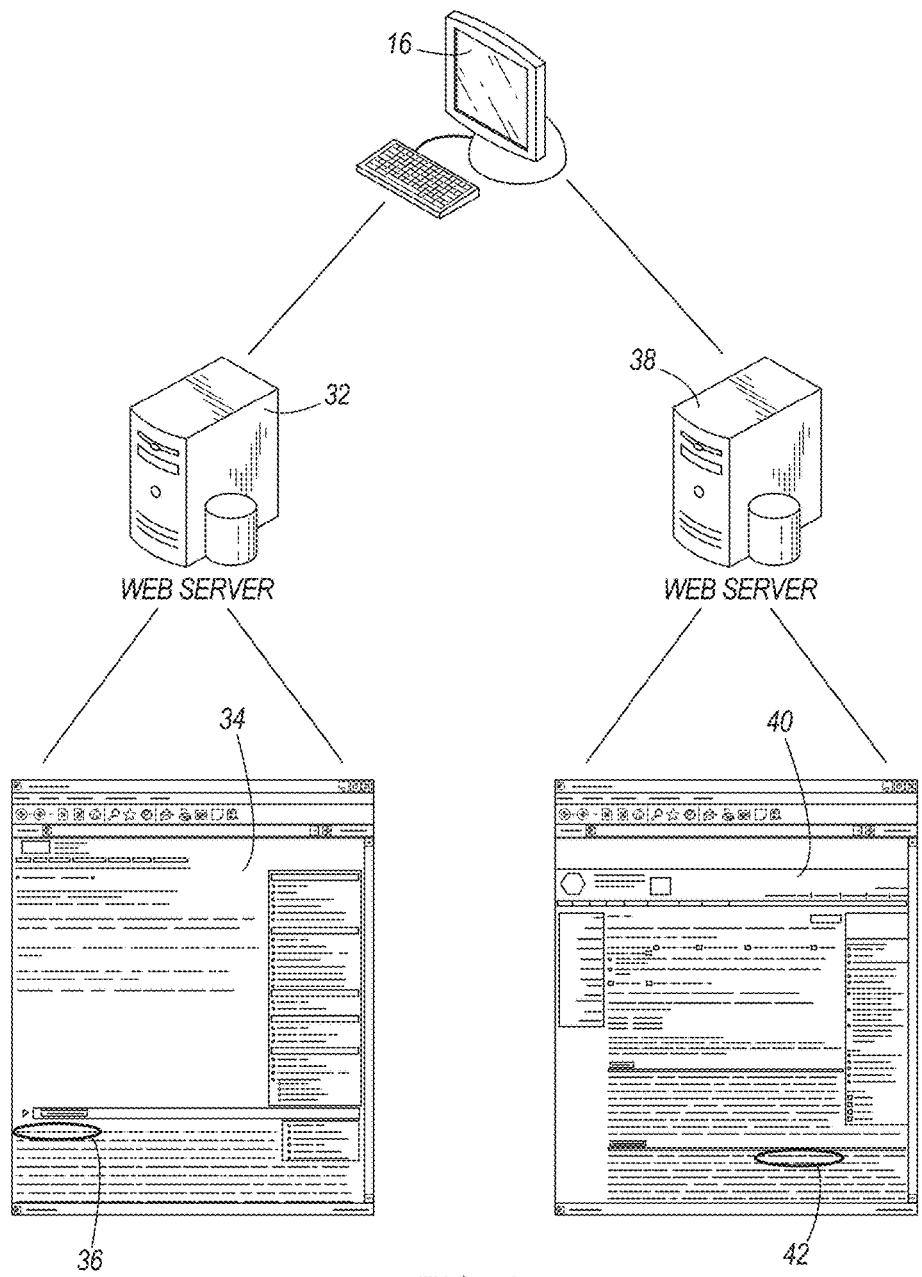
FIG. 1 shows the problem faced by End-Users without the benefit of the present invention.

To facilitate an understanding of the present invention, a number of terms and phrases are defined below:

N4L refers to an application of an information architecture in some embodiments of the present invention that disambiguates scientific names and taxonomic opinions, wherein ambiguity in the meaning and context of scientific names and taxonomic opinions is resolved through the separation and association of the following entity types: Name, Taxon, Nomos, Practitioner, and Exemplar. Relations between Names are resolved through analysis of naming Events. A naming Event is a kind of nomenclatural event (there are other kinds) that names a Taxon in a given state, but not in perpetuity, and optionally modifies the status of a name created in a previous event. Where a nomenclatural event refers directly or indirectly to a previous event, the event points to the previous event and to corresponding entities. Referring events include but are not limited to: emended naming, the naming of a later synonym that changes the synonym type of the name referred to, and all non-naming events. Naming events may be used as the basis for the schema of a database or an XML/SGML repository.

In the application, the entities are represented by means of persistent, uniquely identified, addressable, structured documents, referred to as "information objects."

In the application, information objects are used in the construction of nomenclatural and taxonomic "services."

Information Objects:

An information object (also referred to as a N4L object) is a virtual representation of an "entity"; it may comprise descriptive text, metadata, and data. Each information object is identified by a persistent, globally unique identifier and is directly addressable. Multiple persistent, globally unique identifiers can be employed to identify an information object so long as each derives from separate family of identifiers, e.g., an information object may be identified by one DOI, one LSID, etc. One type of information object is a name object.

In various embodiments, N4L information objects are structured and interlinked. It is therefore possible to build services based on preset queries. Such services can retrieve and display information from N4L objects, and also use information drawn from N4L objects to link to other resources on the Internet.

Entity:

N4L entities are entities that exist in the physical or constructed world.

A "Practitioner" is a scientist or other person who asserts a taxonomic opinion. In some embodiments, the information object or other information associated with a Practitioner contains a reliability score computed from other information objects that accounts for historic performance of the Practitioner.

An "Exemplar" is a curated whole or partial organism, or a representation thereof.

A "Taxon" is a group of one or more Exemplars or a group of one or more subordinate Taxa (plural form of Taxon) that are circumscribed by a Practitioner according to a Nomos. Exemplars and subordinate Taxa can belong to more than one Taxon simultaneously, as long as the Taxa they belong to are revealed by different Nomoi (plural form of Nomos).

A "Nomos" is a methodology (e.g. heuristics, algorithms or principles) used by a Practitioner to interpret data and to reveal and circumscribe Taxa. In one embodiment, an analysis of 16S rRNA gene sequence similarity forms the basis of a Nomos. In some embodiments, phylogenetic, phenotypic, genotypic, phenetic, genomic or polyphasic approaches form the basis of multiple Nomoi. As sequence data accumulates for multiple loci, taxonomic methodologies will become differentiated, and Nomoi will provide a means of formal distinction.

A "Name" is a record of an event, by means of a dated publication, in which a Practitioner circumscribes a Taxon. In one embodiment, a Name is 'new', 'emended', 'corrected', 'rejected', 'conserved', or 'combined'. Names have properties that can be modified by later events.

In one embodiment, "Name" refers to an archived bibliographic record, which links to two other objects: a Taxon object and a publication object. For an Emended Name or a New Combination, links are made both to the current state of the Taxon and to the Taxon as it was when the name was a 'new' Name. Once a Name is recorded, it will persist unchanged, aside from its synonym type.

A "name-like-string" refers to a noun or compound noun phrase that may appear to a parser or a human as a reference to a biological or scientific name or concept. It may appear in special formatting, in full or abbreviated form, and upon first usage points to a published definition of the concept and/or object to which the name applies.

An "Annotation" is a published comment, under strict editorial control, which can be added by a Practitioner, an End-User and/or a skilled N4L curator.

A "taxonomy" is a particular classification of objects arranged in a hierarchical structure. Taxonomies are generally organized by supertype-subtype relationships, wherein by definition the subtype (child) has the same properties as the supertype (parent) plus one or more additional properties. Objects at the same level of the taxonomic hierarchy can be said to have the same "taxonomic rank".

One skilled in the art will recognize that biological exemplars, taxa, and names represent but one instance of a taxonomy of objects related by nomoi. The present invention applies equally to all other sets of exemplars, taxa, and names related by nomoi wherein said nomoi are prescribed and the relationship among the entities is maintained expertly.

Services:

Since N4L objects are directly addressable, they can be visited like any other web page. Information objects, and services derived from them, can be accessed from within other "digital resources" and provided in human readable form, machine readable form, or both.

In some embodiments, services are implemented using standard technology, including DOI (Digital Object Identifier, a proprietary form of Handle resolution services deployed by the Publishers Interlinking Association (PILA) under the governance of the International DOI Foundation (IDF)) multiple resolution in one embodiment, and web services in other embodiments. In yet another embodiment, resolution of a persistent identifier to services results in the rendering of graphical objects in the user interface, enabling the user to select and execute the chosen service. Graphical objects include text-based dropdown menus and pop-up windows, and interactive graphs (e.g., 2D, 3D, and multidimensional plots, tree graphs) containing active regions that respond to user behavior (e.g., the rollover of a mouse) by offering or executing services.

N4L services enable prospective survey of Names, Taxa, and Exemplars: a reference to an N4L object enables the retrieval not only of information that was current when the reference was made, but also of information updates made since then. N4L services consider a Name to be a formal reference to an archived event in the time continuum, and therefore to be an index to all related events.

N4L services enable detailed comparative analysis. The reification of Nomos as an object distinct from the Taxa it reveals, forces the separation of partially or completely overlapping taxa that arise from the application of different taxonomic methods, thereby clarifying differing taxonomic opinions. Revision of an existing Taxon as a result of new data is distinct from assertion of a Taxon that is different from an existing one, though overlapping. The former case is a comparison of two states of the same Taxon. The latter case is a comparison of two heteronomic Taxa (which we define as overlapping Taxa from different Nomoi). Tools for taxonomic comparison (e.g., those provided by the present invention) become increasingly important as taxonomic methodology increases in complexity and becomes more differentiated.

N4L services are provided by computer programs, or extensions, which access the N4L database and/or the N4L-CI (contextual index) database. The N4L database maintains the relationship between the information objects, i.e., it is the instantiation of the taxonomic record. The N4L-CI database provides a many-to-many relationship among the information objects and the digital resources in which they appear, along with other metadata.

Digital Resource

A digital resource is any computer-storable item of textual, data, graphical, or multimedia content, such as STM (scientific, technical and medical) literature, patents, BRC (Biological Resource Center) databases, legal literature, diagnostic machinery databases, contracts, treaties, material transfer agreements, prior informed consent agreements, certificates of origin, other documents establishing provenance, bills of lading, shipping documents, specification sheets, regulations or laws as applied to holding, transportation, or working with an organism, and microarrays/underlying databases which are provided by publishers, culture collections, herbaria, museums, biological databases, governments, NGOs (Non-Governmental Organizations) and others. A digital resource may include encoded text, e.g. in ASCII format, in which case the text may be analyzed directly for occurrences of name-like-strings. In other instances, a digital resource may include images containing text, in which case the text data may have to be extracted from the images as an initial step, for example using optical character recognition (OCR), before the text can be analyzed for occurrences of name-like-strings.

Collection Description

Biological taxonomies are grounded in the typological concept. For each formally named taxon, there exists one or more Exemplars. In instances in which multiple Exemplars exist, one Exemplar is designated the type, the holotype, or the lectotype, and it serves as the principal reference object against which Practitioners make their comparisons. Exemplars are held in various collections and said collections may be housed in museums, herbaria, botanical or zoological gardens, academic institutions, culture collections or biological resource centers. The form of Exemplars is governed by the different Codes of Nomenclature, varies by discipline and may be either preserved or living, whole organisms, parts of whole organisms or pictorial or written representations. Sequences of one or more genes or entire genomes of Exemplars may serve as supporting data and may, in the future, constitute an alternative form. Each Exemplar (type specimen) is uniquely identified with one or more collection identifiers (e.g., accession number) as well as by those identifiers ascribed to the material by the Practitioner, prior to deposit in the said collection(s). The citation of these identifiers in formal taxonomic descriptions is governed by the applicable Code and provides a means by which Practitioners may locate and retrieve Exemplars.

In the N4L model, Exemplars are aggregating objects that contain information about organisms, especially those from which biological material is curated; for example the type or a non-type strain/specimen and associated data and services specific to that strain/specimen. Exemplars are assigned a unique and persistent identifier. Where the same organism is deposited in multiple collections, by means of cloning, serial passage or segmentation, references to those multiple deposits are held in a single Exemplar object. Exemplars are information objects that record their relationships with each other, with N4L information objects of other classes (e.g., Name, Taxon) and with other information resources. Referencing deposits and data by means of N4L Exemplars alleviates much of the current ambiguity associated with determining equivalency and availability of such materials Globally Unique Identifiers and Resolution Systems A 'globally unique identifier' is a type of identifier used in software applications to provide a reference which is guaranteed to be unique in any context. One method for producing these identifiers has been standardized by the Open Software Foundation (OSF) and documented as part of ISO/IEC 11578:1996 "Information technology—Open Systems Interconnection—Remote Procedure Call (RPC)" and more recently in ITU-T Rec. X.667|ISO/IEC 9834-8:2005. This standard refers to the identifiers as Universally Unique Identifiers (UUIDs). A common implementation of this standard has been promulgated by Microsoft, which refers to these identifiers as Globally Unique Identifiers (GUIDs).

While globally unique identifiers work well within the context of a computer, or even a network of computers, it has been recognized that there needed to be implemented methods which ensure that the object pointed to by such an identifier always resolves to the object being identified. This need led to the creation of 'persistent identifiers', globally unique identifiers provided by an organization which guarantees that the identifier will resolve to the object identified in perpetuity. This guarantee has two components—a 'social' contract and a resolution system.

In the scientific, informatics, and publishing communities, resolution software and services are used to provide persistent access to (especially) distributed resources. Resolution systems that find use in an embodiment of N4L are typically Uniform Resource Identifiers (URIs), and include Handles and Uniform Resource Names (URNs). Digital Object Identifiers (DOI), which are an implementation of Handle, and Life Science Identifiers (LSID), which are an implementation of URN, are both good examples. Archival Resource Keys (ARK) and Persistent Uniform Resource Locators (PURL) are other resolution systems. More than one type of persistent identifier/resolution system could be used in an implementation of a N4L application, depending on the needs of the community that is making use of the entities represented by the information objects.

General Definitions

As used herein, the terms "processor" and "central processing unit" or "CPU" are used interchangeably and refer to a device that is able to read a program from a computer memory (e.g., ROM or other computer memory) and perform a set of steps according to the program.

As used herein, the terms "computer memory" and "computer memory device" refer to any storage medium readable by a computer processor. Examples of computer memory include, but are not limited to, RAM, ROM, computer chips, digital video discs (DVD), compact discs (CDs), hard disk drives (HDD), and magnetic tape.

As used herein, the term "computer readable medium" refers to any device or system for storing and providing information (e.g., data and instructions) to a computer processor. Examples of computer readable media include, but are not limited to, DVDs, CDs, hard disk drives, magnetic tape and servers for streaming media over networks. In various embodiments, aspects of the present invention including data structures and methods may be stored on a computer readable medium.

As used herein, the term "encode" refers to the process of converting one type of information or signal into a different type of information or signal to, for example, facilitate the transmission and/or interpretability of the information or signal. For example, image files can be converted into (i.e., encoded by) electrical or digital information. Likewise, light patterns can be converted into electrical or digital information that provides an encoded video capture of the light patterns.

As used herein, the term "N4L enhancement" refers to metadata embedded within a digital resource which responds to a user-initiated behavior in a predictable manner. For example, when a hyperlink in a HTML document is selected by a user's mouse, the web browser loads the page referenced. More sophisticated behaviors can occur with the use of, for example, a JavaScript event model.

As used herein, the term "internet" refers to any collection of networks using standard protocols. For example, the term includes a collection of interconnected (public and/or private) networks that are linked together by a set of standard protocols (such as TCP/IP, HTTP, and FTP) to form a global, distributed network. While this term is intended to refer to what is now commonly known as the Internet, it is also intended to encompass variations that may be made in the future, including changes and additions to existing standard protocols or integration with other media (e.g., television, radio, etc). The term is also intended to encompass non-public networks such as private (e.g., corporate) intranets and the private military internets.

As used herein, the terms "World Wide Web" or "web" refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols that may be used in place of (or in addition to) HTML and HTTP.

As used herein, the term "web site" refers to a computer system that delivers content and services over a network using the standard protocols of the World Wide Web. Typically, a Web site corresponds to a particular Internet domain name and includes the content associated with a particular organization. As used herein, the term is generally intended to encompass both (i) the hardware/software server components that delivers the content and services over the network, and (ii) the "back end" hardware/software components, including any non-standard or specialized components, that interact with the server components to perform services for web site users and the tools used by said web site users.

As used herein, the term "HTML" refers to Hyper-Text Markup Language that is a standard coding convention and set of codes for attaching presentation and linking attributes to informational content within documents. During a document authoring stage, the HTML codes (referred to as "tags") are embedded within the informational content of the document. When the Web document (or HTML document) is subsequently transferred from a Web server to a browser, the codes are interpreted by the browser and used to parse and display the document. Additionally, in specifying how the Web browser is to display the document, HTML tags can be used to create links to other Web documents (commonly referred to as "hyperlinks").

As used herein, the term "HTTP" refers to Hyper-Text Transport Protocol that is the standard World Wide Web client-server protocol used for the exchange of information (such as HTML documents, and client requests for such documents) between a browser and a Web server. HTTP includes a number of different types of messages that can be sent from the client to the server to request different types of server actions. For example, a "GET" message, which has the format GET, causes the server to return the document or file located at the specified URL.

As used herein, the term "URL" refers to Uniform Resource Locator that is a unique address that fully specifies the location of a file or other resource on the Internet. The general format of a URL is protocol://machine address:port/path/filename. The port specification is optional, and if none is entered by the user, the browser defaults to the standard port for whatever service is specified as the protocol. For example, if HTTP is specified as the protocol, the browser will use the HTTP default port of 80.

As used herein, the term "in electronic communication" refers to electrical devices (e.g., computers, processors, etc.) that are configured to communicate with one another through direct or indirect signaling. For example, a conference bridge that is connected to a processor through a cable or wire, such that information can pass between the conference bridge and the processor, are in electronic communication with one another. Likewise, a computer configured to transmit (e.g., through cables, wires, infrared signals, telephone lines, etc.) information to another computer or device, is in electronic communication with the other computer or device.

As used herein, the term "web service" is a software system designed to support interoperable machine-to-machine interaction over a network. A specific web service would consist of an Application Programming Interface (API) that may be invoked from a client system to retrieve data or execute a process on a remote system.

As used herein, the term "transmitting" refers to the movement of information (e.g., data) from one location to another (e.g., from one device to another) using any suitable means.

A "tag" is a way of electronically marking content to associate it with additional information and metadata, or to impose a specific structure on the specific content to make it distinct from the surrounding content. Examples of tags include XML and HTML elements. One type of tag is a metadata tag.

As used herein, "metadata" refers to descriptive data about data of any type. Metadata may describe a single datum or entire collections of similar data. It provides context for data and additional information to the user, and may associate one piece of data with another piece of data based on properties shared in common. Metadata often refers to the structure (also referred to as the schema) of a database or of a document encoded in XML or SGML. In one embodiment, metadata refers to the description of the types of data contained in Name, Taxon, Exemplar, Nomos and Practitioner information objects and other types of structured data that may be linked to such information objects.

As used herein, the term "XML" refers to Extensible Markup Language, an application profile that, like HTML, is based on SGML (Standard Generalized Markup Language). XML differs from HTML in that: information providers can define new tag and attribute names at will; document structures can be nested to any level of complexity; any XML document can contain an optional description of its grammar for use by applications that need to perform structural validation. XML documents are made up of storage units called elements which contain either parsed or unparsed data. Parsed data is made up of characters, some of which form character data, and some of which form markup. Markup encodes a description of the document's storage layout and logical structure. XML provides a mechanism to impose constraints on the storage layout and logical structure, to define constraints on the logical structure and to support the use of predefined storage units. A software module called an XML processor is used to read XML documents and provide access to their content and structure.

As used herein, the term "interactive graphic", refers to a digitized image representing the relationship(s) among two or more independent and dependent variables in which the labels are available for processing by an N4L application or can directly link to N4L information objects directly. In one embodiment, such interactive graphics include, but are not limited to heatmaps, phylogenetic trees, scatter plots, line drawings or other figures that use names or other labels that refer to organisms or features of organisms that may be stored in Name, Taxon, or Exemplar objects.

As used herein, the term "extension" refers to an auxiliary computer program that interacts with a host application to provide extended, specific capability. There exist a very large number of extensible host applications, including web-browser applications, such as Microsoft Internet Explorer and Mozilla Firefox; document viewing programs, such as Adobe Acrobat; and document creation programs, such as Microsoft Word. Extensions for these programs are typically written in a high-level programming language using a defined Application Programming Interface. Though subtly distinct in actual application, as used herein, the term "plug-in" is used synonymously with "extension" and "add-on".

As used herein, the term "string" refers to a sequence of characters, wherein the characters may be encoded using any recognized coding scheme, such as ASCII, Unicode, etc.

As used herein, the term "expertly curated database" refers to a repository of domain-specific information that is maintained under the guidance of one or more individuals having acknowledged expertise in a particular field who are capable of ensuring the accuracy and integrity of the information stored within said repository. In one instance, an expertly curated database on the nomenclature of Bacteria and Archaea is one that is maintained under the guidance of one or more acknowledged experts who are familiar with the appropriate codes of nomenclature that govern the formation and application of biological names and are capable of ensuring that the links among Names, Taxa, Exemplars, Nomi, Practitioners and the taxonomic literature in which nomenclatural events occur.

As used herein, "expert curation" is the process of maintaining the integrity and accuracy of a database or other knowledge resource by an acknowledged domain expert. In one instance, expert curation refers to the maintenance of a database or knowledge store of biological names by an acknowledged expert in the field of biological nomenclature. In one embodiment, an expert in the field of biological nomenclature is someone who holds a post-graduate degree in biology. In another embodiment, an expert in the field of biological nomenclature is someone who holds a post-graduate degree in the biological sciences and specializes in systemic biology. In yet another embodiment, an expert in the field of biological nomenclature is someone who has authored or co-authored at least one publication in the field of biological nomenclature.

DETAILED DESCRIPTION OF THE INVENTION

The following description is merely exemplary in nature and is not intended to limit the present disclosure, application, or uses. It should also be understood that throughout the drawings, corresponding reference numerals indicate like or corresponding parts and features. In respect of the methods disclosed, the order of the steps presented is exemplary in nature, and thus, is not necessary or critical. In addition, while much of the present invention is illustrated using biological taxonomy examples, the present invention is not limited to these embodiments.

The present invention provides systems and methods for automatically identifying name-like-strings in digital resources, matching these name-like-strings against a set of names held in an expertly curated database, and for those name-like-strings found in said database, enabling said resource by associating a globally unique identifier with said name, wherein said globally unique identifier can be used to retrieve additional matter, such as information about the name that is held within said database and pointers to other digitally accessible resources which include the same name or synonyms thereof, about said name.

The value of the invention is clearly demonstrated by FIG. 1 which highlights the difficulty experienced by an End-User without the advantage of the presently described invention. An End-User using a computer 16 is interested in learning about some named organism 36, which is referenced in a journal article 34. The journal article 34 is web-accessible since it resides on a web server 32. Finding the journal article 34 potentially requires a significant amount of effort on behalf of the End-User. Similarly, a reference to the same organism 42, though quite possibly with a different, but synonymous name, exists in another journal article 40 which is web-accessible via a web server 38. While mechanisms using bibliographic referencing exist for linking the journal article 40 to the journal article 34, these mechanisms do not guarantee that the mention of the organism of interest appears in the journal article 40. Furthermore, if the journal articles are not linked via bibliographic reference, a similar degree of effort that was needed to locate the journal article 34 is needed to locate the journal article 40.

Figure 2:
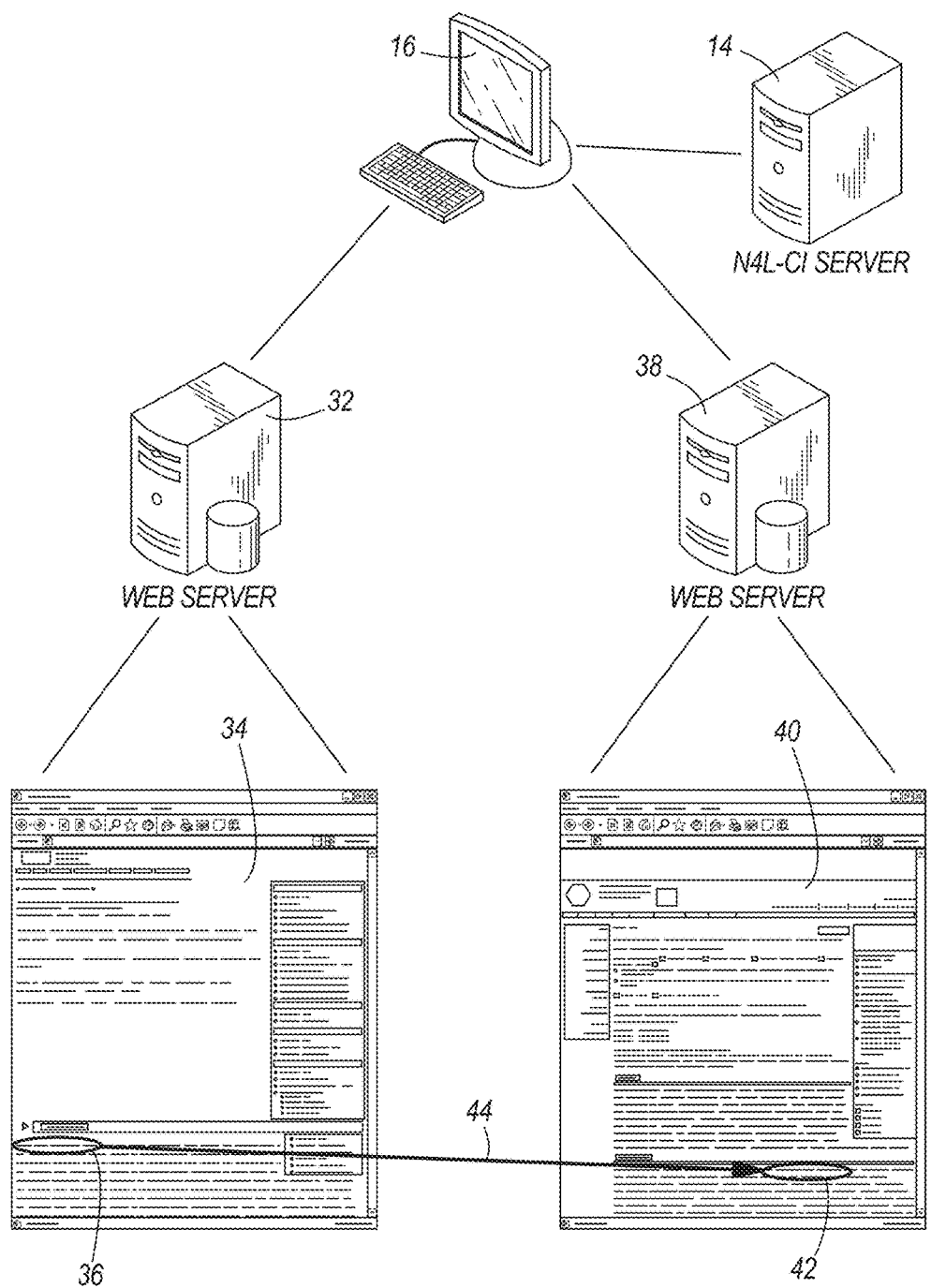
FIG. 2 shows how the present invention mitigates the current problem by facilitating access to other documents that contain verified references to a particular object.

FIG. 2 demonstrates the value of the presently disclosed invention. Display of the journal article 34 can be enhanced with a browser plug-in as described below. During the course of processing the journal article 34, the plug-in queries a N4L-CI server 14 which returns the location of the organism's name 42 in the journal article 40. The N4L enhancement provides a direct link 44 from an instance of the organism's name in the journal article 34 to an instance of the same name 42 in the journal article 40. Thus, the amount of time needed to locate successive references to the organism of interest is reduced to essentially zero. It is noted that in the context, the phrase "same name" also means any other name or label that is known to denote an entity for which the N4L database records a relation with the organism that is the focus of research. The N4L database uses the expertly curated taxonomic structure previously disclosed by Garrity et al. (US Pat. Appl. Publ. No. 2005/0160059), incorporated by reference herein.

It should be apparent that the linking of journal articles represents but one form of digital resources that may be enhanced by the current invention. In addition to STM literature, patents, BRC databases, legal literature, diagnostic machinery databases, contracts, treaties, material transfer agreements, prior informed consent, certificates of origin, other documents establishing provenance, bills of lading, shipping documents, specification sheets, and microarrays/underlying databases which are provided by publishers, culture collections, herbaria, museums, biological databases, governments, NGOs and others, can all benefit from enhancement with the presently-described invention.

Embodiments of the invention are described in the following non-limiting examples:

EXAMPLE 1

Shipping of Biological Materials

The regulations relevant to the shipping of biological materials are based on the name of the material being transported. The regulations are formulated based on the nature of the material—those that are deemed hazardous require additional protections, certifications, etc., when transported from one location to another. Since this system is based on names, at least two types of system failures are possible. In a first failure case, the name of a hazardous material could be changed such that the new name is no longer contained within the list of hazardous materials. In this case, insufficient precautions would be taken when shipping the material, thus potentially putting peoples' lives at risk. In a second failure case, the name of a benign material could be changed such that the new name is within the list of hazardous materials. In this case, extraordinary precautions would be taken when shipping the material, thus placing unnecessary financial burden on the shipper. In both cases, were the name in the regulation enhanced as described herein, the regulation would be made independent of changes to the material's name, thus the regulations would forever dictate correct handling methods.

EXAMPLE 2

Patent Searching

The number of patents which reference biological names is quite large. For example, 375,000 US patents issued between 1976 and 2007 were found to contain names of bacteria. For inventors, patent attorneys, and patent examiners, being able to quickly determine if a potential infringement exists is vitally important. However, given the rate at which names change, this becomes an onerous task. With the use of the presently described invention, that which was onerous becomes trivial. All other patents which include mention of an organism can be instantly identified regardless of the name changes that may have occurred subsequent to the publication of the patent.

Figure 3:
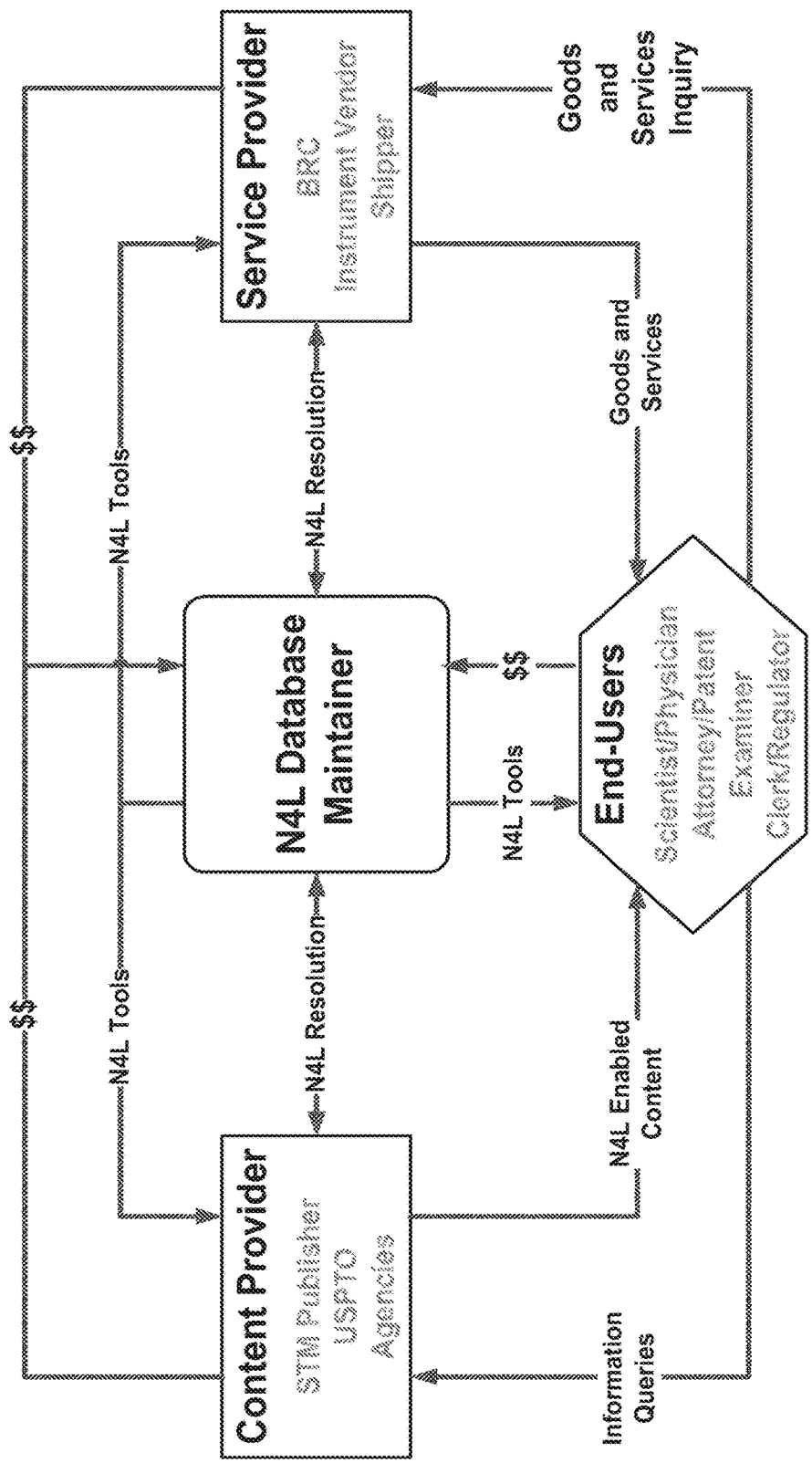
FIG. 3 shows the business process by which the actionable services associated with enhanced objects are employed.

FIG. 3 shows how a N4L application provides a means for generating revenue. The N4L Database Maintainer has three primary functions: to maintain the core taxonomic database (N4L), to maintain the contextual index database (N4L-CI), and to provide tools for enhancing digital resources.

Content Providers are typified by organizations which produce articles, patents, regulations, etc. These organizations can use the software tools developed in accordance with the present invention to create enabled digital resources prior to their publication (described in detail below). Using the present invention, the process of enabling a digital resource makes it more valuable because it ensures persistent access to proper names, reduces the level of effort needed to validate a digital resource prior to its publication, finds errors in a digital resource, and facilitates the finding of additional digital resources. After enablement, Content Providers make their content available to End-Users, for example on a fee-per-use basis.

Service Providers are typified by organizations which provide living matter, diagnoses based on sample inspection, shipping services, etc. These organizations acquire tools from NamesforLife and use these tools to enable digital resources prior to their usage (described in detail below). Using the present invention, the process of enabling a digital resource makes it more valuable because it ensures persistent access to proper names, ensures compliance with changing regulations, and provides an easy means for End-Users to be aware of relevant products and services. After enablement, the products and services offered by the Service Providers are more easily found by End-Users, thereby potentially increasing the sales of these products and services.

An End-User is an individual or organization who accesses digital resources from Content Providers and/or uses products and services offered by Service Providers. When accessing previously enabled digital resources or when the digital resource is enabled on-the-fly (described in detail below), software on the End-User's computer enhances the digital resource by providing a menu of information and/or actionable services associated with each recognized name-like-string in the digital resource. Due to the value of the information provided and/or due to the savings in effort inherent with the use of the presently described invention, the End-User will be willing to pay to use these services.

The following discussion shows how one embodiment of the presently described invention may be implemented.

Figure 4:
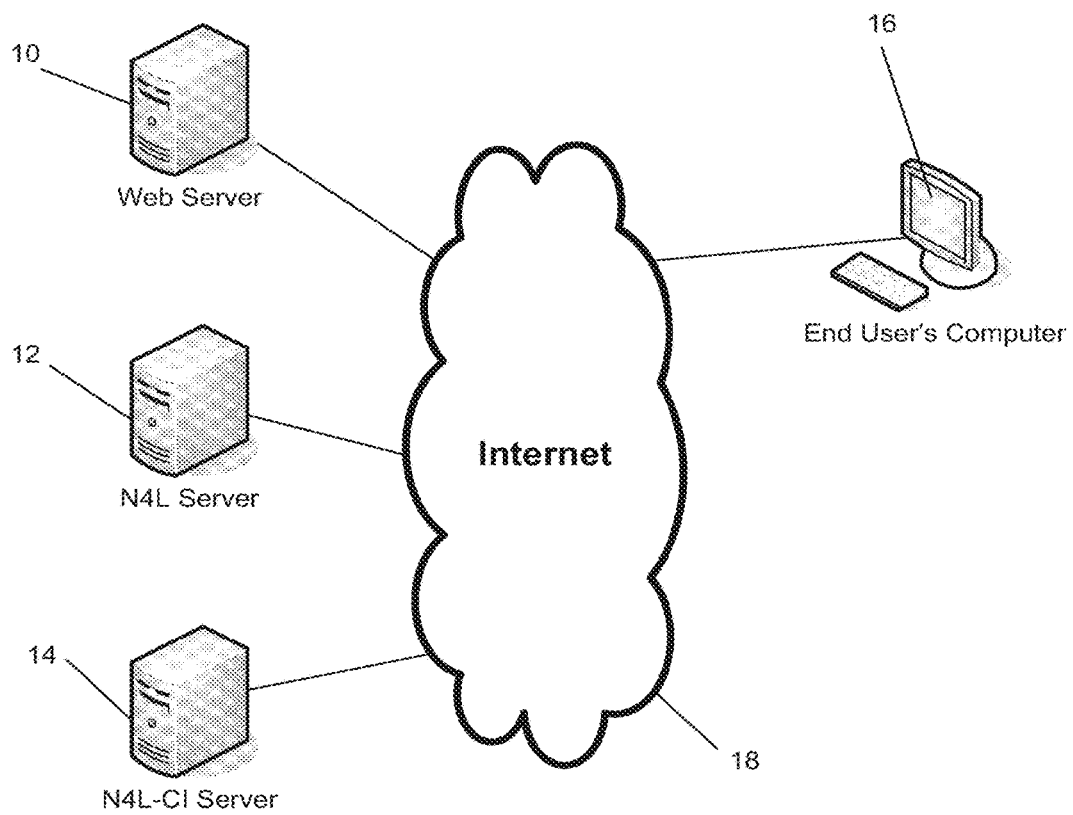
FIG. 4 shows a network diagram with all relevant computers identified.

FIG. 4 depicts a network architecture with relevant computers identified. The computer 16 provides access to networked resources for an End-User. The End-User, working at a computer 16, accesses certain information residing on a web server 10, typically using a web browser. The present invention requires the use of a software program, typically embodied as a N4L plug-in for said web-browser.

A N4L Server 12 contains an expertly curated database which relates information objects to each other based on taxonomic structures which adhere to rules of nomenclature. The N4L-CI Server 14 includes a database that records a many-to-many relationship between information objects and the digital resources in which they are referenced. These records may also include additional metadata, for example, the number of times the name (i.e., reference to an information object) occurs within the digital resource. The N4L Server 12 and The N4L-CI Server 14 may optionally be the same computer and may optionally be connected to the same local area network.

Figure 5:
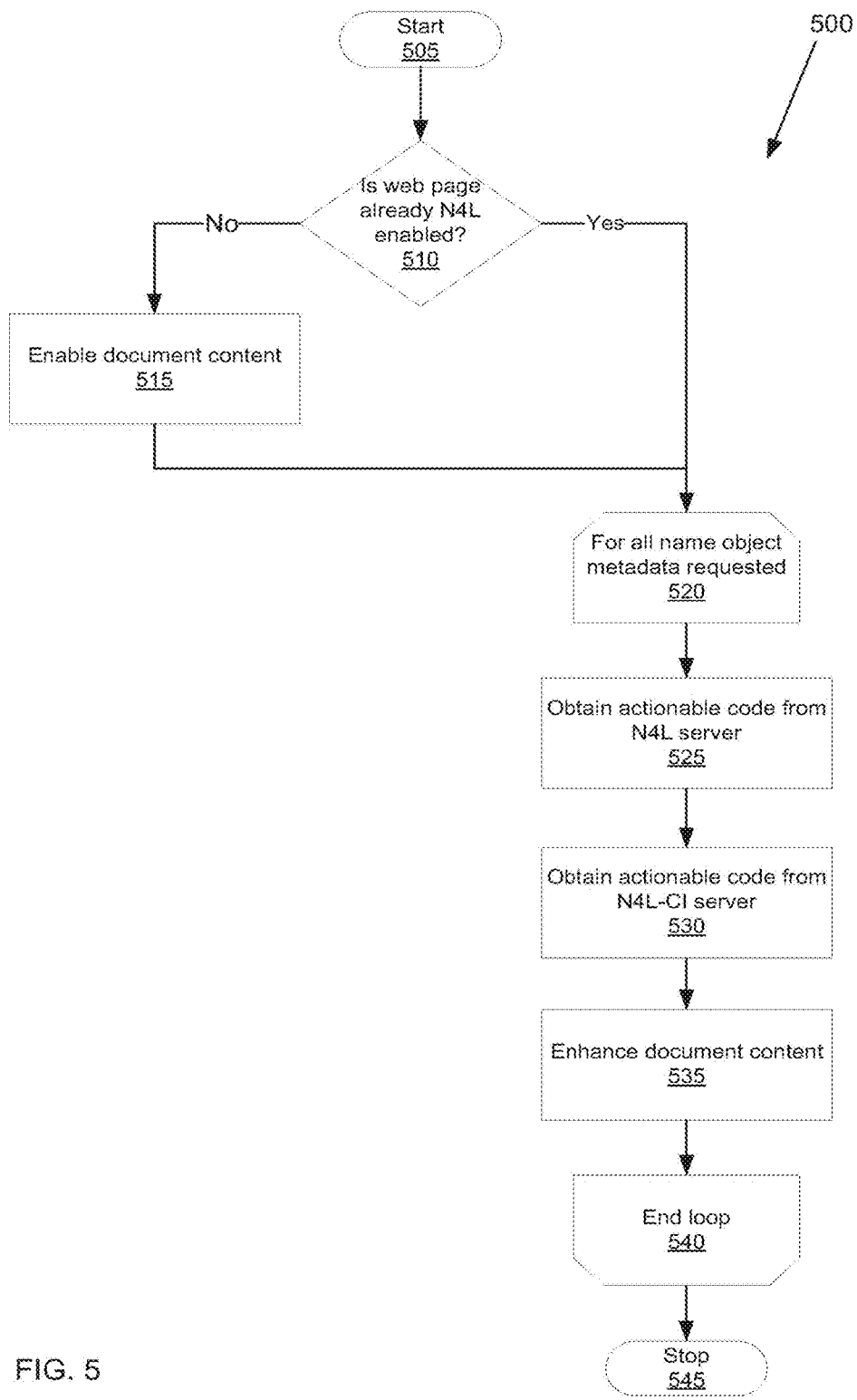
FIG. 5 shows how additional metadata may be requested from a server and be displayed within the context of an enhanced document.

The functionality embodied in the N4L plug-in is shown in the method 500 outlined in FIG. 5. The method 500 begins at start 505. Initially, the digital resource (e.g. web page document) is examined to determine if it has been previously enabled 510. One method for so doing is to check for the existence of a META tag created during the publisher workflow process. A page is said to be enabled if the name-like-strings within the page have associated with them persistent identifiers which provide links to information objects and additional services.

If the digital resource has not been previously enabled, document content enablement 515 (described below in detail) occurs on-the-fly. Once the resource is enabled, enhancement occurs. The plug-in can embody the enhancement in at least one of three manners: it may a priori retrieve metadata for all persistent identifiers in the digital resource, it may retrieve metadata on demand when the user selects a name-like-string for which there is an associated persistent identifier, or it may use a combination of the above methods.

The following steps are performed in a loop for each of the name object metadata requested 520, after which the loop ends 540 and the method 500 ends 545. The persistent identifier is used to make a query 525 against the N4L database 12. This query returns an actionable code snippet, typically written in JavaScript, which provides N4L enhancement of the name-like-string. Said N4L enhancement may, for example, when chosen by the End-User, result in the display of the chronology of name changes for an organism.

Next, the persistent identifier is used to make a query 530 against the N4L-CI database 14. This query returns an additional actionable code snippet and/or document fragment, typically written in JavaScript, which identifies other digital resources or digital records of non-digital resources in which the same name-like-string or other name-like-strings which resolve to the same Exemplar appear. The code snippet returned from the N4L-CI server 14 is combined with the code snippet returned from the N4L server 12, resulting in a single code snippet. This code snippet is then associated 535 with the name-like-string in the document.

Figure 6:
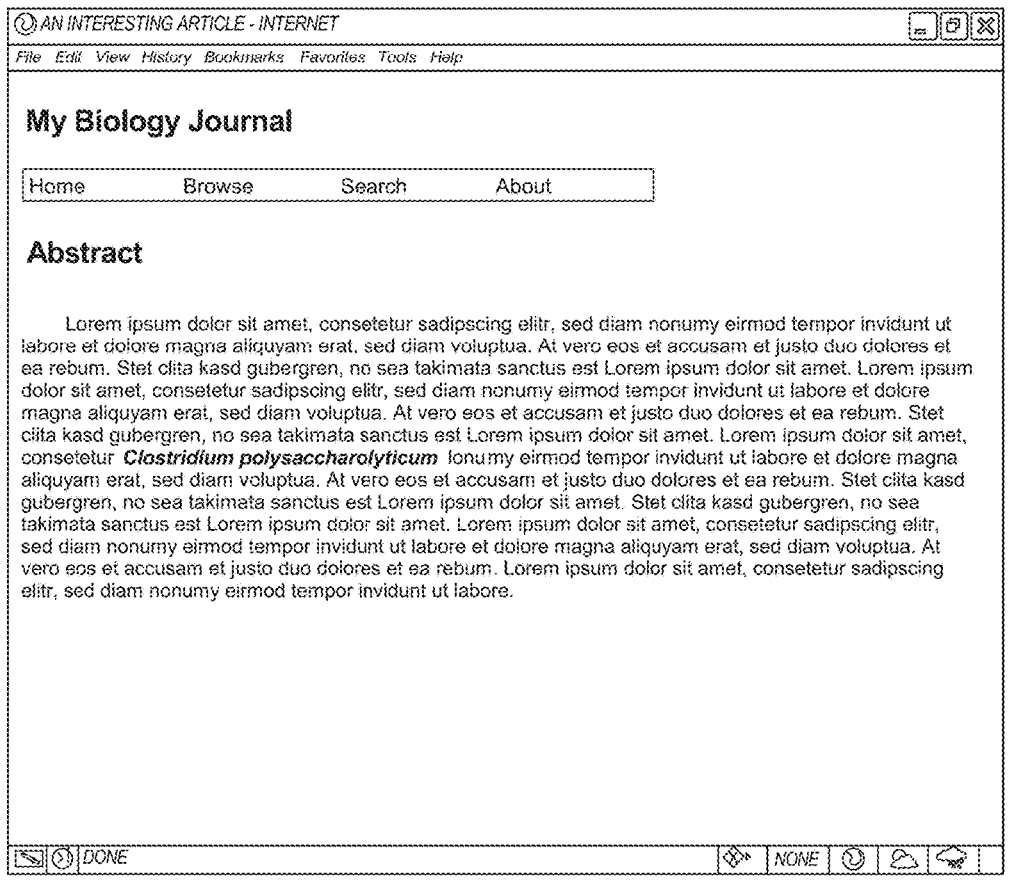
FIG. 6 is a view of a document as it exists prior to enhancement.
Figure 7:
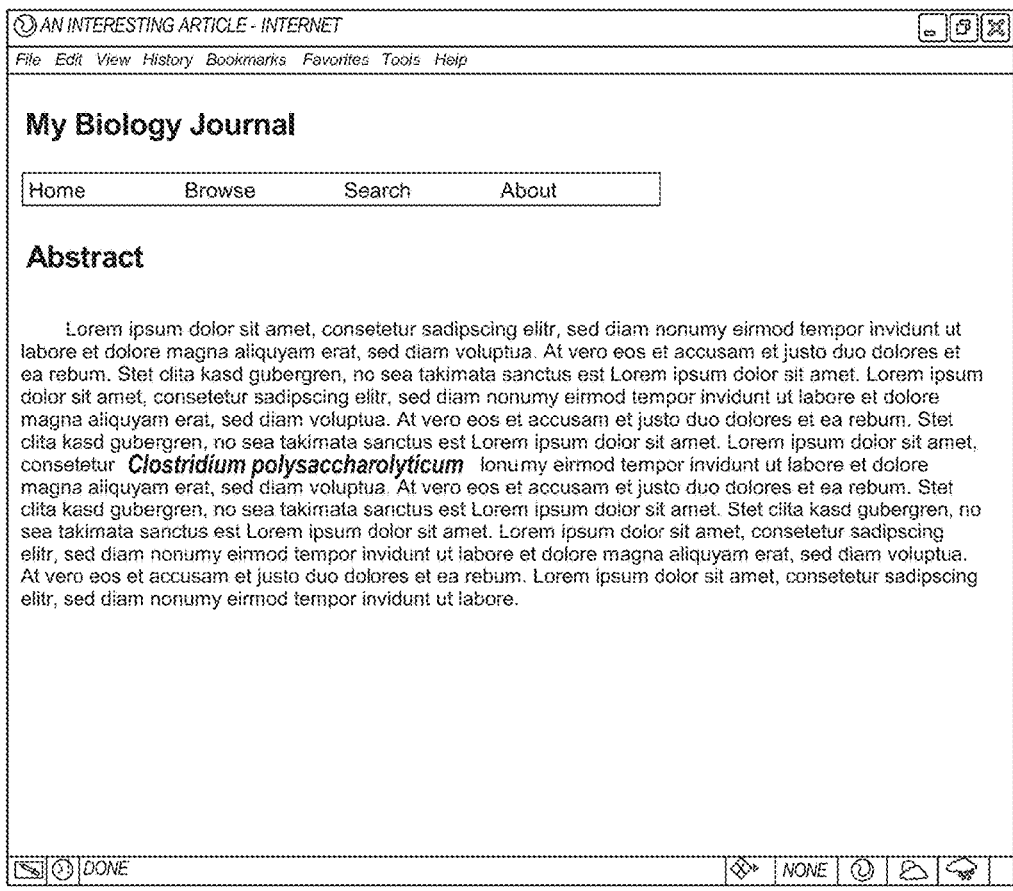
FIG. 7 is a view of the document enhanced with the presently described invention, where the name-like-strings have been made visually distinct.
Figure 8:
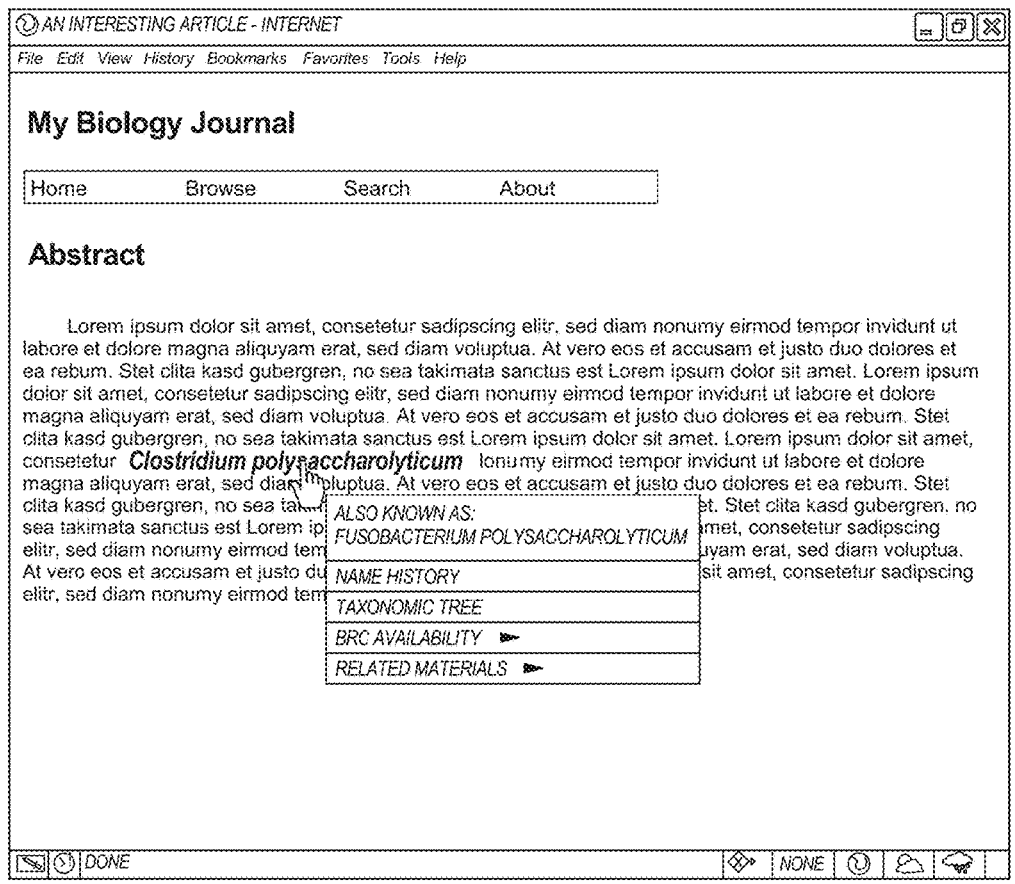
FIG. 8 is a view of the document after an End-User has activated the event handling code which is included within the enhancement of the digital resource.

An example of how this N4L enhancement appears to the End-User is shown in FIGS. 6-8. FIG. 6 shows a page from an online resource that has not been enhanced. FIG. 7 shows the same page, after the N4L enhancement code snippet has been added to the resource, resulting in name-like-strings being made visually distinct without interfering with the general presentation of the document. FIG. 8 shows a dynamic pop-up menu activated by the End-User's mouse-over of the N4L enhanced content. Each of the menu items shown is actionable; the selection of any menu item results in some specific action.

The shading of the items in the menu is significant. In this example, the unshaded menu items are those which are offered for free to the End-User. For example, by selecting the menu item 'Taxonomic tree', a new browser window showing the relationship of the selected organism to other organisms will be displayed. Selecting the 'Related materials' link will require that the End-User pay a fee for accessing the information. The information could include other articles, patents, etc., in which the same name is used.

In another embodiment, an N4L persistent identifier, particularly of the type Digital Object Identifier (DOI), resolves to a DOI/Handle record containing multiple data fields, each of a typed value, where the value type (e.g., URL, string) is known in advance by software built on the N4L model. The application then constructs graphical objects for the user to manipulate, for example menu structures. Resolution to the values in the Handle record allow the graphical objects to be populated, for example as items in a menu.

For different classes of N4L object, e.g., Name, or Exemplar, value types may vary. For example, one value type for Name might be an enumerated value from 'current' or 'deprecated'. A value type for Exemplar might be an integer representing the number of names it has been classified with. The schema of value types for a class of object is bound to its DOI application profile. By this means, N4L resolution services are registered with the International DOI Foundation and the Application Programming Interface (API) for building resolved content into tools and services is formally managed.

Two processes for enabling digital resources are described, although other processes are also possible. The first is the Workflow model for situations in which the original digital resource is read-only and which results in the production of a new enabled document, and the second is the Plug-in model for those situations where the digital resource resides in memory and is enabled without generating an entirely new document. Two approaches for the Plug-in model are described.

Figure 9:
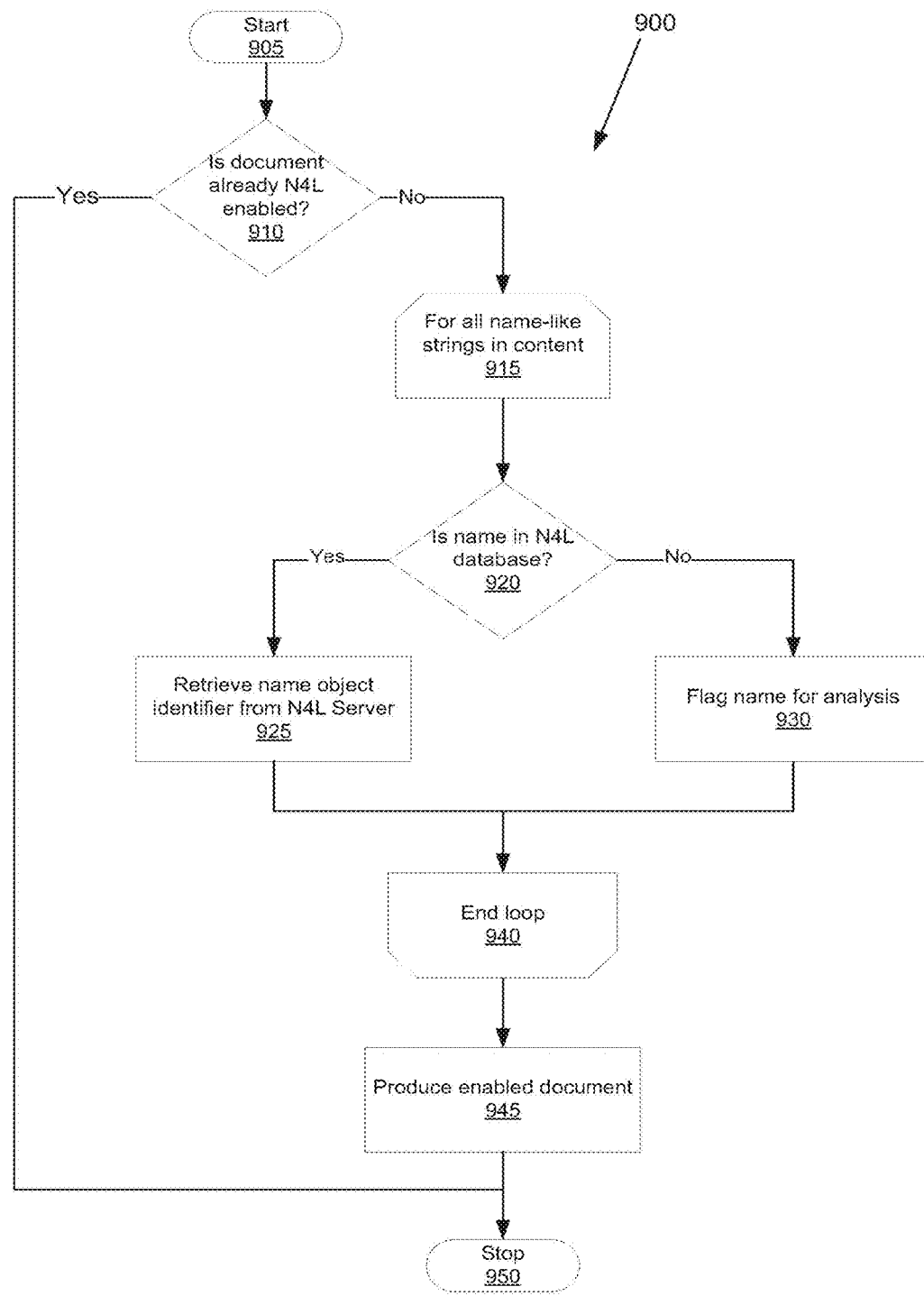
FIG. 9 shows the Workflow model for situations in which the original content is read-only and which results in the production of a new enabled document. This process would typically be integrated into an existing publication process.

FIG. 9 provides a flowchart 900 showing the process steps for the Workflow model, where the flowchart 900 starts at 905 and stops at 950. This is referred to as the Workflow model as this processing is typically performed by Content Creators in an off-line manner. In this case, the Content Creator has an original document to be enabled by the presently described invention. The output of the enablement is a new document, distinct from the first, which is then possibly subjected to additional process steps prior to publication. Note that the output is not necessarily web content, i.e., HTML. Instead, the output can be XML, or any other document format, which could then be subjected to additional processing steps. The information embedded by the N4L program is encapsulated in such a manner that it remains intact throughout the successive processing steps.

The process for the Workflow model may be implemented as a standalone program, as a client to a hosted service (such as a web service), or via an extension to an existing application such as a web browser or document editor (such as Microsoft Word or XML Spy).

Following the start 905, the first step is to determine if the content has already been N4L-enabled 910. The next step is to identify all name-like-strings in the document (content), as described below, and for each instance perform step 920 and either step 925 or step 930 in a loop 915, until all instances have been analyzed, when the loop ends 940. Any of a plurality of methods for identifying name-like-strings may be employed, including, for example, identification based on typographic convention, parsing the document for strings formatted in a particular manner and/or occurring in specific relations to other strings, and identification based on a lookup table of known names. This process can be performed by the program which implements the Workflow process, by a N4L server, or by some combination of the two. The process may search the graphical as well as the textual portion of the content to find name-like-strings. The outcome of this process is a determination of whether or not each name-like string is in the database 920.

For those cases in which the name-like-string is found in the database, the unique persistent identifier associated with said name is returned (i.e. the name object identifier is retrieved from the N4L server) 925 and is inserted into the document being processed by associating it with the name-like-string. For example, this can be accomplished with a XML metadata object that includes the name-like-string and the persistent identifier. In addition, the name and its inclusion in the digital resource is recorded in the N4L-CI database 14.

For those cases in which the name-like-string is not found in the database, the Content Creator will be made aware of this fact (i.e. the name is flagged for analysis) 930, providing the opportunity for one of several actions in response to this situation.

A first action is to provide a list of names that are similar to the name-like-string, i.e., it is assumed that there is a typographical error. The list is presented to the Content Provider, who is offered the opportunity to correct the error by selecting the correct name from this list. The selected name is recorded, the document is updated, and the information is stored in the N4L-CI database 14.

A second action is for the Content Creator to ask the document's author for clarification. The author's response would dictate the necessary changes to the document, for example, if the name is not validly published, it would be reformatted as a quoted string.

A third action applies to a selected subset of publishers, those whose publications are the ones in which new names are first validly published. Within these publications, there will exist sentences whose syntax indicates that an unrecognized name-like-string is the definition of a new name. In these cases, the tool would provide the publisher the means to notify the curator of the N4L database of the new name, thereby providing a means for the N4L database to be updated to include the new name. This notification process may involve human intervention, may be handled programmatically, or some combination of the two.

One of the outcomes from this process may be the identification of errors in the original document. While human readers are quite tolerant and forgiving of errors, machines are not. Given the vast amount of information being produced, more and more digital resources are being read and digested by machines. By being able to identify and fix errors prior to publication of an article, the value of the digital resource is greatly increased in that it can now be accurately read by a machine reader. This will lead to an improvement in the factors used to quantify the quality/importance of an article, thereby increasing its value to the publisher.

Once a document has been enabled 945 during production by the association in the text of names with N4L identifiers, its metadata is updated to record that this process has taken place, for example in a META element.

Figure 10:
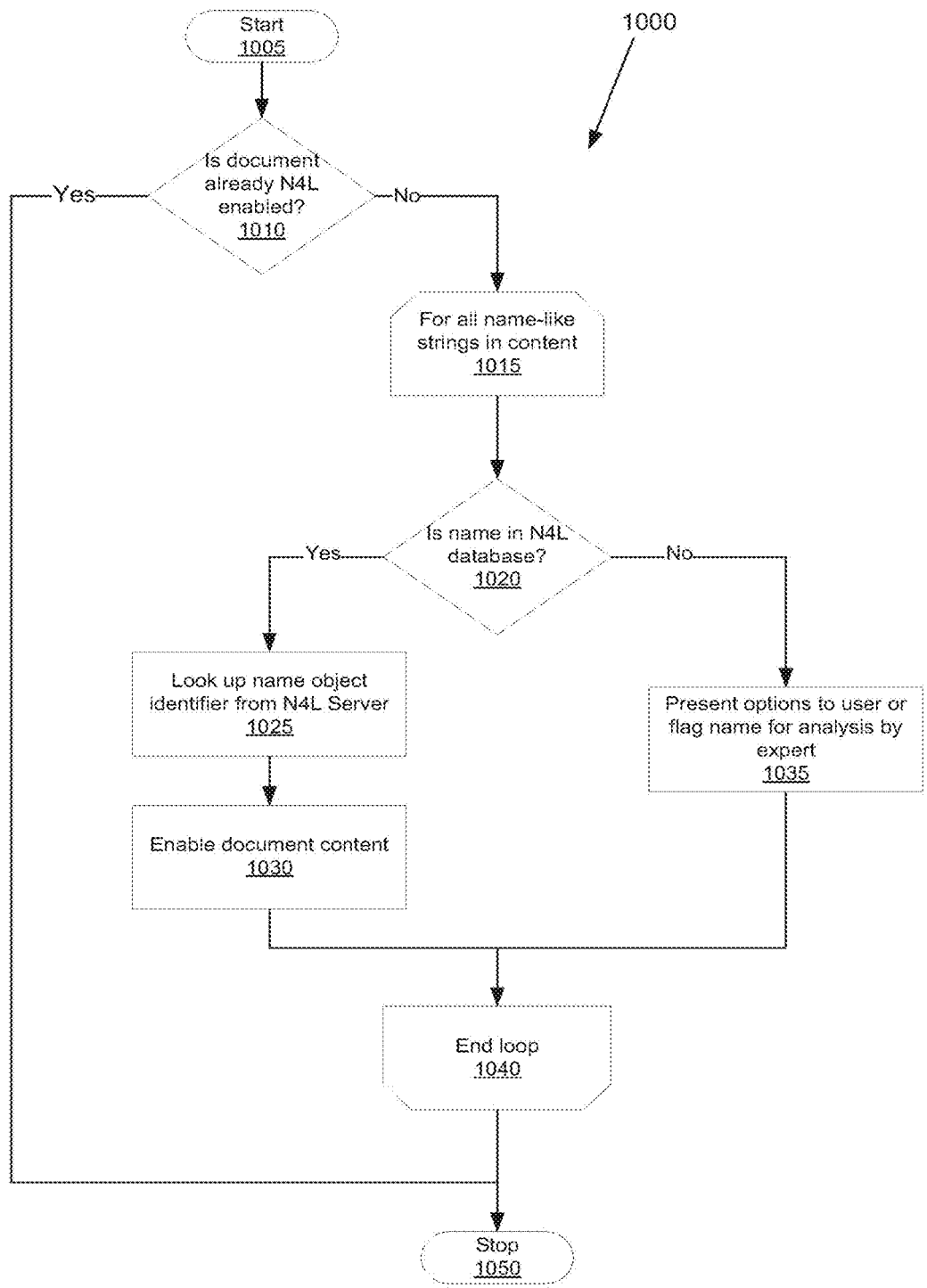
FIG. 10 shows the Plug-in model for those situations where the digital resource resides in memory and is enhanced without generating an entirely new document. This process would typically be implemented as an add-on, extension, or plug-in for a web browser, document editor, or similar extensible application.

FIG. 10 provides a flowchart 1000 showing the process steps for the Plug-in model, the flowchart 1000 starting at 1005 and stopping at 1050. This is referred to as the Plug-in model as this processing is typically performed on a digital resource via an add-on to an existing application. In this case, the process user has an original document to be enabled by the presently described invention. The processing is done in-memory, thus the output of the enablement is a modification of the original document and is typically not stored for future use.

The process for the Plug-in model, which runs on End-User computer 16, is typically implemented as a browser extension, although it can also be implemented as an add-on to any other program which is used to view or edit digital resources. It could also be a stand-alone program which can access network-accessible digital resources.

The first step is to determine if the document has already been N4L-enabled 1010. One manner in which this can be done is to look for the existence of a META tag in the document header that was produced prior to publication by the Workflow model process. In this case, no further processing is required. Another is to determine if the document has been previously processed via the Plug-in model and stored in the N4L-CI database 14. In this case, the N4L-enabled document may be returned from the N4L-CI database 14 to replace the current working version of the document.

The next step is to identify all name-like-strings in the page, as described below, and for each instance to loop through one or more of steps 1020, 1025, 1030, and 1035, until all instances have been analyzed, when the loop ends at 1040. Any of a plurality of methods for identifying name-like-strings may be employed, including, for example, identification based on typographic convention, parsing the document for strings formatted in a particular manner and/or occurring in specific relations to other strings, and identification based on a lookup table of known names. This process can be performed by the program which implements either the (1) Workflow or Plug-in model process, (2) by a N4L server, or (3) by some combination of the two. The process may search the graphical as well as the textual portion of the content to find name-like-strings. In the case where some part of this process is performed by the server, the plug-in can optionally send the name-like-strings to the server individually; it can combine all of the name-like-strings into a single document and send it to the server; or it can send the entire original document to the server. In the latter case, the server then has the ability to store the document in a pre-processed form as described above. The outcome of this process is a determination of whether or not each name-like string is in the database 1020.

For those cases in which the name-like-string is found in the database, the unique persistent identifier associated with said name is returned (i.e. the name object identifier is looked up and returned from the N4L server) 1025 and is inserted into the document being processed by associating it with the name-like-string (i.e. the document content is enabled) 1030. For example, this can be accomplished with an XML metadata element that includes the name-like-string and the persistent identifier. In addition, the name and its inclusion in the digital resource is recorded in the N4L-CI database 14.

For those cases in which the name-like-string is not found in the database, one or more of several actions occur 1035. One action is to identify recognized names that are similar to the name-like-string and prepare an actionable code snippet and/or document fragment with a list of possible names, which are then made available to the End-User. While the name selected from the list by the End-User may be recorded, this usage is not deemed to be authoritative and is not stored in the N4L-CI database 14. A second action is to store the unrecognized name-like-string, along with the context in which it occurs, and to have an expert curator determine if the string is in fact a name. An End-User's selection of a name from the list of possible names may be used by the curator to assist in determining the proper name to be associated with the string. The determination made by the curator is deemed authoritative, this authority is noted by the creation of a new record within the N4L-CI database 14, and future viewings of the web page will include enhancements associated with the proper name.

Figure 11:
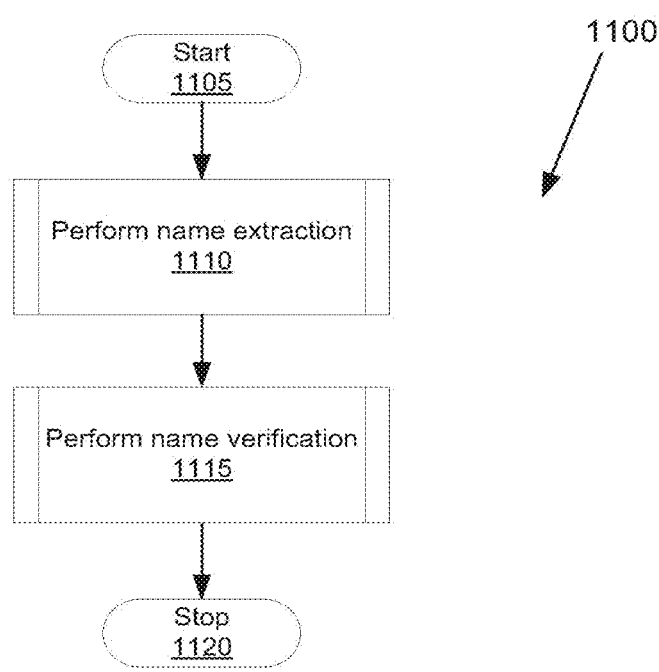
FIG. 11 shows the general process for enabling the content of a digital resource.

One step in the N4L enablement process, as mentioned above, is the identification of name-like-strings in the digital resource. FIG. 11 provides a flowchart 1100, starting at 1105 and stopping at 1120, depicting the overall process for identifying the name-like-strings contained within a digital resource. In one embodiment, this process consists of two stages. First, an algorithm extracts 1110 from the digital resource those strings that are thought to be names, see FIG. 12. Second, the extracted strings are then subjected to verification 1115, see FIG. 13.

As mentioned above, one method of identifying occurrences of name-like-strings in a digital resource is to check each word in the target resource against a database of known name-like-strings, in a "brute-force" manner.

Figure 12:
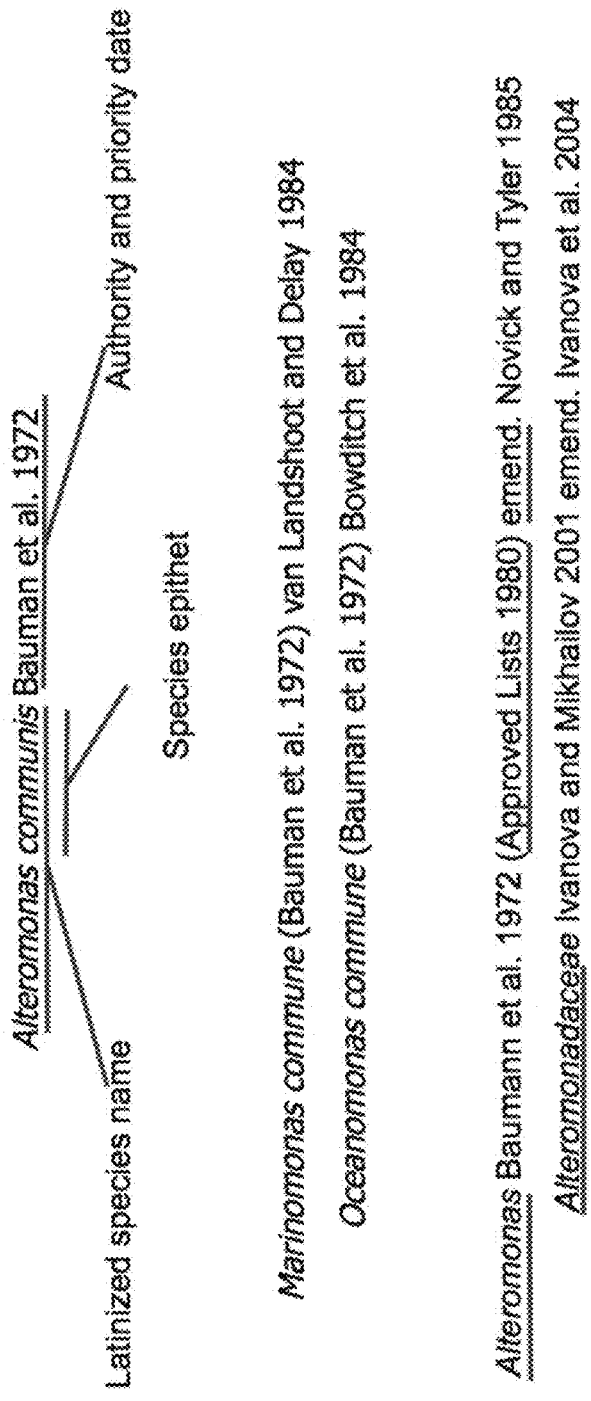
FIG. 12 shows examples of name-like-strings as they might appear in a digital resource, and how these might be recognized as name-like-strings based on at least one of typographic, formatting, and stylistic conventions.

Other methods involve identifying name-like-strings based on typographic, formatting, and/or stylistic conventions that are used when referring to name-like-strings, FIG. 12. For example, in formal taxonomic writing, name-like strings can be recognized based on a series of typographic and stylistic conventions that serve as visual cues to human readers that are prescribed by the various Codes of Nomenclature. Biological names are generally Latinized, which by convention results in these names appearing in italics at all taxonomic ranks for Bacteria and Archaea and for genera (plural of genus) and species for plants, fungi, yeasts, protists and animals. In some instances, names may also have rank-specific suffixes (e.g. -acea=family, -ineae=suborder, -ales=order, -idea=subclass).

In formal taxonomic proposals that include a prologue and a diagnosis (also referred to as a description or circumscription of the taxonomic concept along with the name and its etymology), the Latinized name appears in italics and is typically followed by an authority string (the name of the author(s) proposing the original taxonomic assertion, the date, and possibly the page of the original published description. In instances where the name has undergone subsequent revision, the authors of the latest revision and accompanying cues regarding the nature of the revision are also included in the authority string). The name-like string may also contain information about the nomenclatural event and accompanying taxonomic assertion by phrases such as "species novum", "combinatio novum" in full or abbreviated form. Additional clues may gleaned from the name based on the suffix (family—aceae; suborder—ineae; order—ales; subclass—idea.

In normal usage, names appear in a less highly stylized format and may exclude most of the supplementary information regarding the authority for the name. By convention, names may also appear in an abbreviated form (e.g., *Bacillus subtillis*=*B. subtillis*). Formatting of the name in italics is, however, regularly preserved to indicate that the name has standing in the literature (and various databases). If the name appears in upright text and is surrounded by quotation marks, it is deemed to be a name without formal standing in the taxonomic literature.

Discovery of name-like strings in digital content can be accomplished by examining digital content for the presence of various tags or other embedded processor instructions that are used to trigger a display device, a printer, or a digital typesetting system to format a particular portion of the text in italics. Name-like strings are then examined for additional known properties including the text immediately following the string for the identity of the naming authority, the presence of various modifiers indicating taxonomic rank and name status. As only a portion of strings appearing in italics are names, additional logic based on the appropriate stylistic and typesetting conventions can be added into the process of discovering other names and excluding incorrect names. Name-like strings are then compared to a database of known names with standing in the literature to determine whether or not a particular name-like string has previously been encountered, and the string is flagged for expert curation if appropriate.

Figure 13:
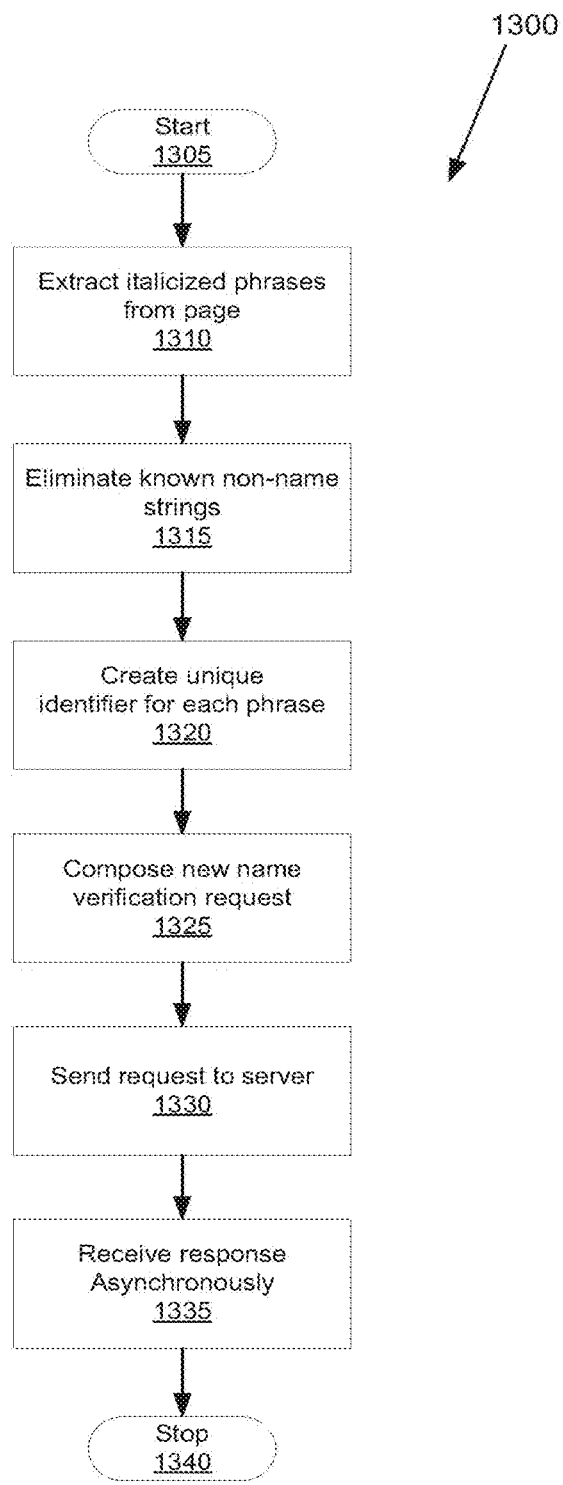
FIG. 13 shows an embodiment of a process for extracting name-like strings from a digital resource.

FIG. 13 provides a flowchart 1300, starting at 1305 and stopping at 1340, depicting one embodiment of the Name Extraction process for biological names. In the case of biological names, the names often appear italicized in text. For this reason, one embodiment of the name extraction process is to identify and extract all italicized strings within the digital resource (page) 1310. This is simply done by searching the resource for the tags which indicate that the text located between the tags is italicized.

Once the initial identification has been completed, a next step of eliminating from future consideration known non-name strings is performed 1315. For example, identification via typographic convention may result in the finding of the string "et al." One embodiment for performing this step is to filter the preliminary list against a dictionary of italicized terms that appear frequently but are not names. The filtering process will remove many of these known non-names.

To each remaining item in the list of name-like-strings, a unique identifier (such as a simple numeric index) is then created and assigned for each phrase 1320. In one embodiment, these items are compiled into a message (a new name verification request) 1325 that is sent asynchronously to the N4L server 1330 for verification. The server then responds asynchronously with a list of verified names with their associated DOI 1335.

Figure 14:
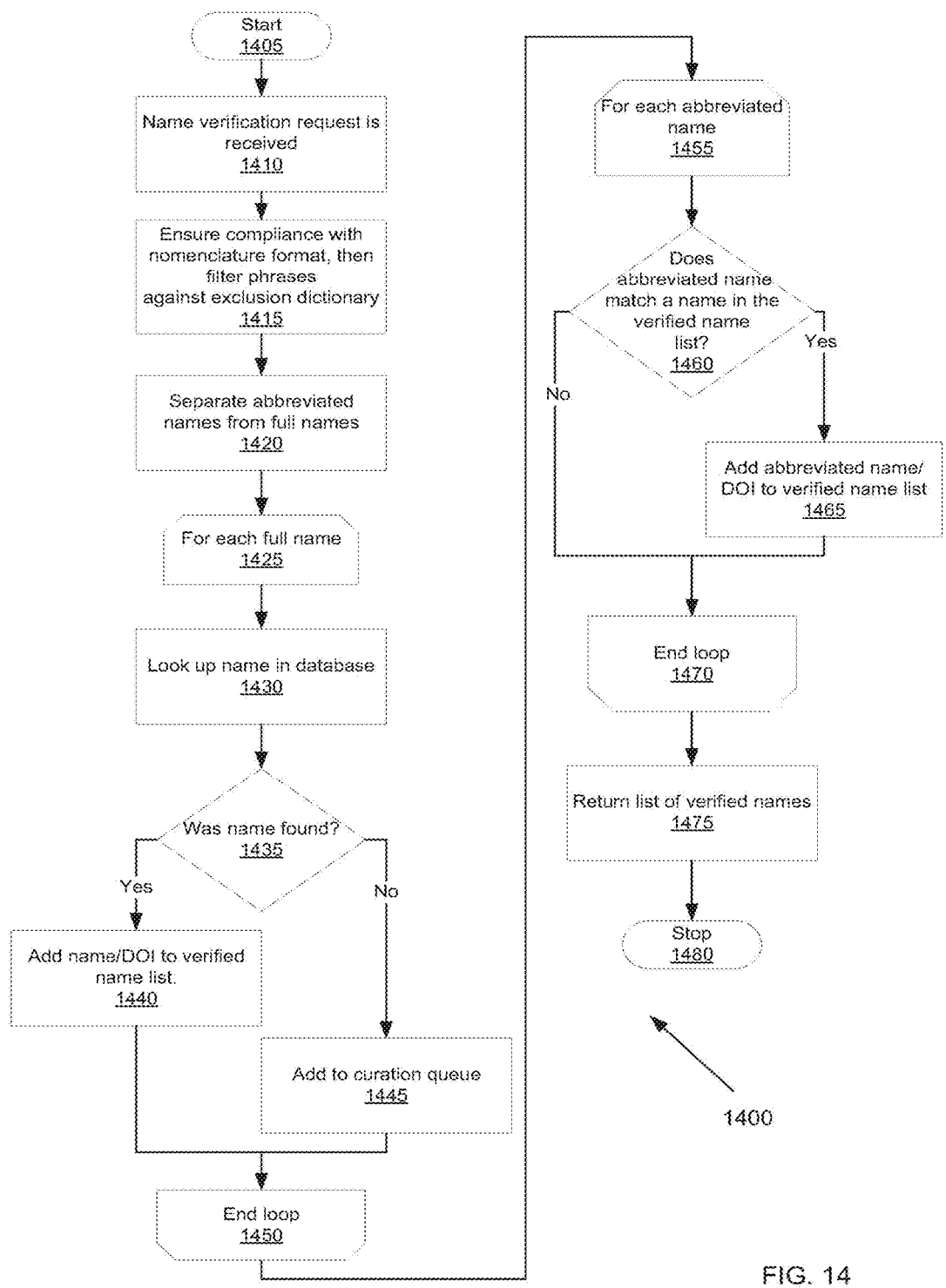
FIG. 14 shows the process performed to verify that name-like-strings are in fact names.

FIG. 14 provides a flowchart 1400, starting at 1405 and stopping at 1480, depicting one embodiment of the Name Verification process. When a name verification request is received 1410, each string in the list is examined to ensure it conforms to the bacterial nomenclature format 1415, e.g., "Xyz abcde" would be considered a possible full name and "Xyz. abcde" would be considered a possible abbreviated name, so both are name-like strings. In regular expression terms, this would be the equivalent of "[A-Z][a-z]*[a-z]+" or "[A-Z][a-z]*. [a-z]+". The list of potential names is then filtered against a second dictionary, to exclude name-like strings that are known to be invalid 1415. Each name-like string in the filtered list is examined and placed into one of two lists: 1) a list of full names, and 2) a list of abbreviated names, to separate abbreviated names from full names 1420.

A loop 1425 is performed for each full name, the loop ending at 1450: Each name-like string in the list of full names is then looked up in the N4L database 1430. If the name is not found in the database, some additional action is taken, as described above, e.g. the name is added to a queue for expert curation, 1445. If the name is found in the database, the DOI is returned, and the name/DOI pair is added to a list of verified names 1440.

After the list of full names has been processed, a loop 1455 is performed for each abbreviated name, the loop ending at 1470. Each name-like string in the list of abbreviated names is matched against the list of verified names to determine if each abbreviated name matches a name in the verified name list 1460. For each name that the abbreviated name matches in the list of verified names, the abbreviated name and its matching name's DOI is added to the verified name list 1465. After checking each abbreviated name, the list of verified names and their associated DOI's are then returned to the client 1475.

Figure 15:
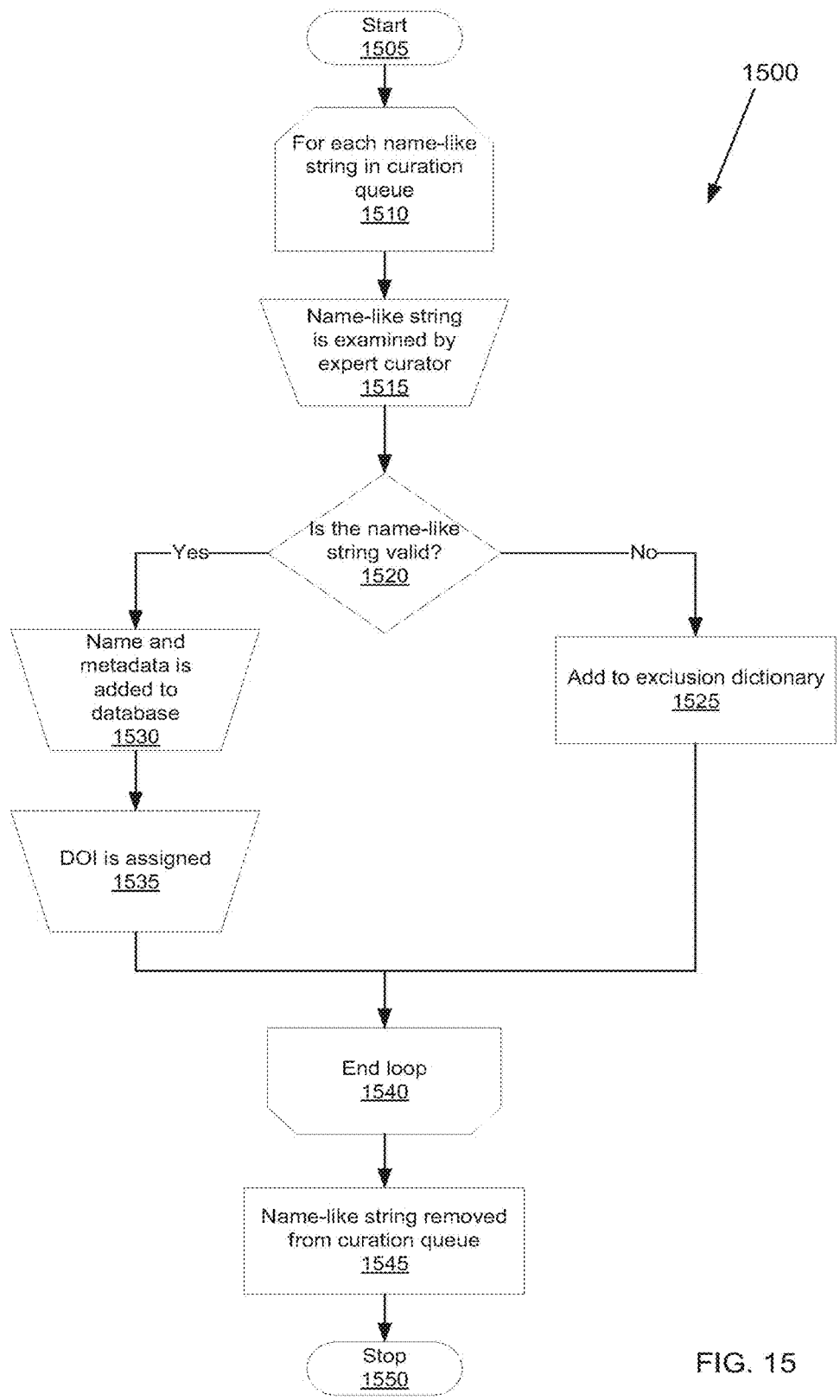
FIG. 15 shows the a high-level overview of the database curation process.

FIG. 15 provides a flowchart 1500, starting at 1505 and stopping at 1550, depicting a high-level overview of the database curation process. A loop is executed for each name-like string in the curation queue 1510, the loop ending at 1540. Each name-like string is examined by an expert curator 1515 and it is determined whether the name-like string is valid 1520. If the name-like string is determined to be invalid, it is added to the Exclusion Dictionary 1525 and removed from the curation queue 1545. If the name-like string is determined to be a valid name, the curator adds the name and appropriate metadata to the database 1530, and assigns a new DOI 1535. The name is then removed from the curation queue 1545.

One difficulty facing users of taxonomic data such as that being operated on by the currently disclosed invention, including for example researchers and data curators (e.g. persons who execute the process described in FIG. 15), is understanding the taxonomic and temporal relationships between the information objects. In the case of biological nomenclature, these relationships arise due to events such as literature events (e.g. the publication of a naming Event), which result in the creation of an object, the creation of a connection between objects, or a change in the status of an object.

It is known that humans best understand concepts when they are presented visually. Given the manner in which data are stored in a database or are presented as lists, they are not easily amenable to human intuitive understanding. Thus, for these types of data, two coupled visualizations will assist the users' understanding of the data.

Figure 16:
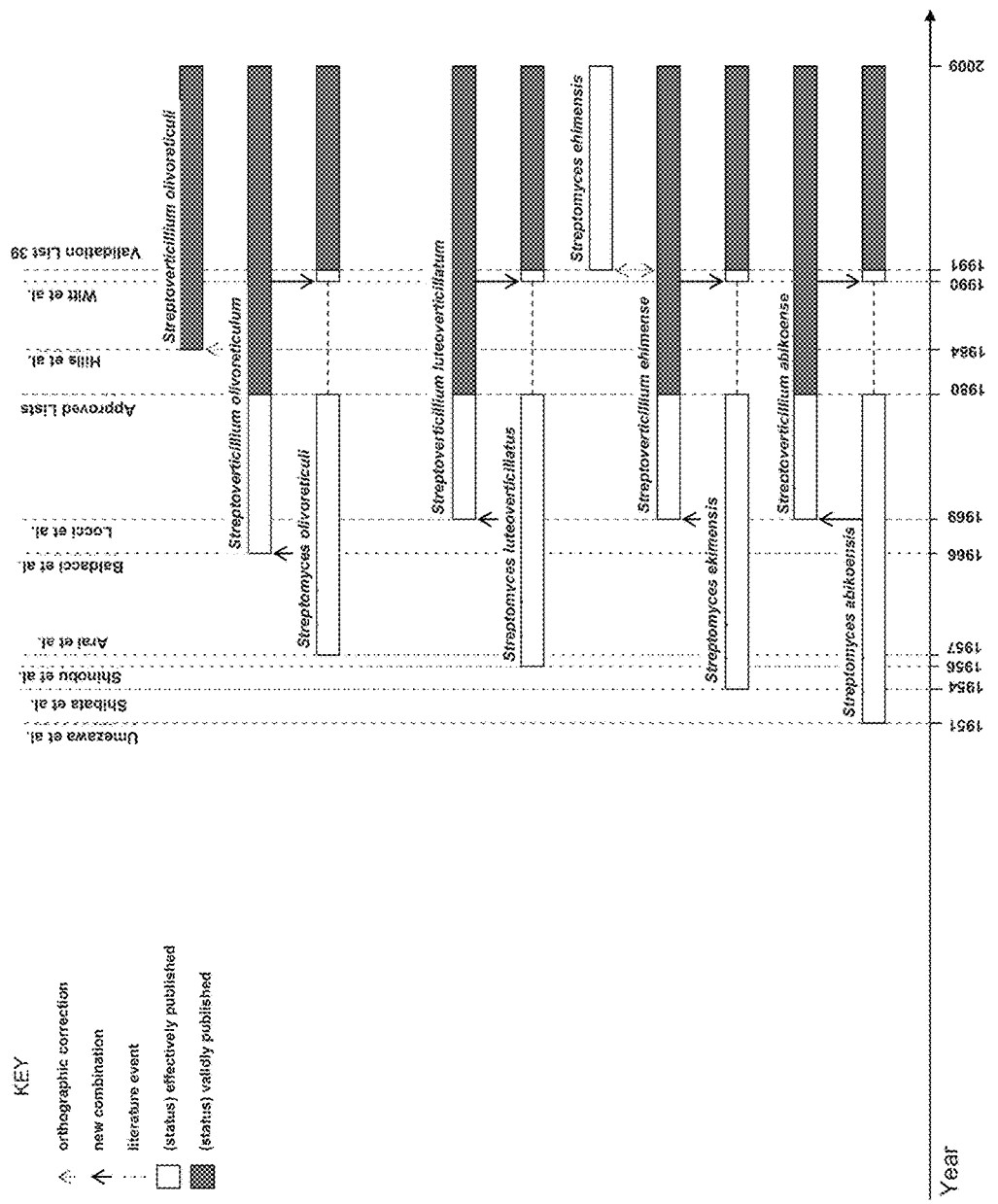
FIG. 16 shows an example of a time-based visualization method.

An embodiment of the first visualization method, shown in FIG. 16, is in the form of a timeline, with nomenclatural events creating branches from the original name. This visualization does not contain the taxonomic relationships. Instead, it is a chart of objects showing their status and interconnections. The chart presents each name along with all of the nomenclatural events, such as effective publication date, valid publication date, corrections and new combinations. Each of these events is asserted by a literature reference and is stored in the N4L database. An automatically-generated timeline chart such as that shown in FIG. 16 presents one or more objects using a visual indicator, which in FIG. 16 is a horizontally-oriented bar. The visualization also shows relationships among the objects and between the objects and the timeline using dashed lines and arrows. Nevertheless, other visual depictions of the temporal relationships of the objects can also be employed. In addition, the terms 'horizontal' and 'vertical' are arbitrary distinctions which used for convenience in the present discussion, e.g. the axes and data shown in FIG. 16 could be reversed such that the timeline is vertically oriented.

In this embodiment, the temporality of the events is shown using the timeline along the horizontal (time-based) axis. The temporal divisions (time points) may be evenly spaced or, alternatively, may be compressed or expanded at various points to provide more even spacing of dates and events or for other considerations. The objects in this visualization can be vertically arranged in order to group together like species or for other considerations, or the vertical arrangement of the objects may be arbitrary. Several vertical orderings of the objects, any of which can be selected by the user when the diagram is being generated, include alphabetical by name, chronological by date of first usage, and minimization of crossing lines.

Figure 17:
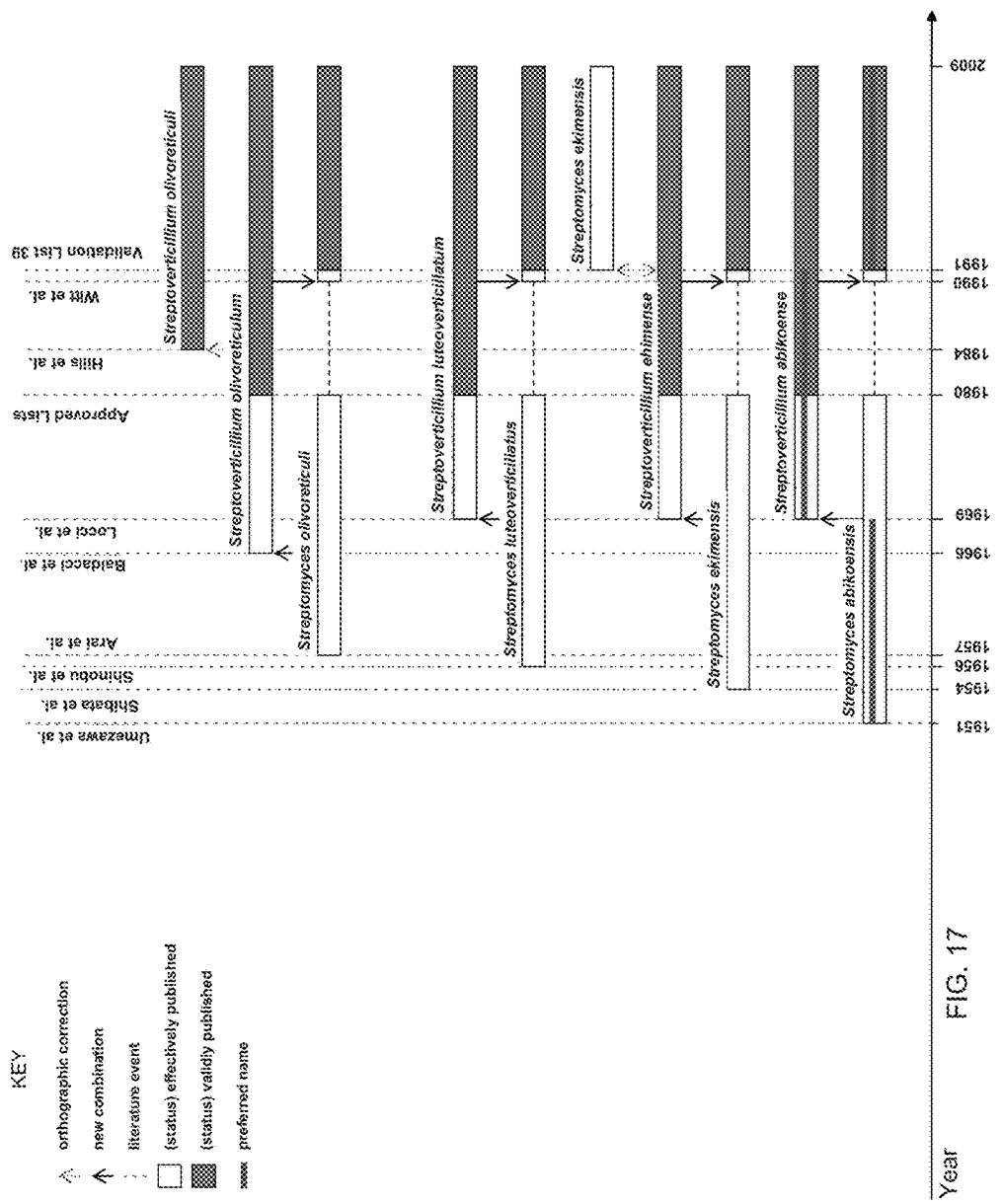
FIG. 17 shows another example of a time-based visualization method.

FIG. 17 presents the same visualization as FIG. 16 with the addition of a second visual indicator such as a thick line, which in one embodiment can be colored to more readily differentiate it from the background. This visual indicator (line) indicates the preferred name at any given time, e.g. the name preferred by experts in the field. There can only be one preferred name per exemplar at any given time. This line is conceptually similar to a critical path through a Gantt chart. Other methods of identifying the preferred name as a function of time can also be employed, for example by altering the color or shading of the bars or by other appropriate markings.

Figure 18:
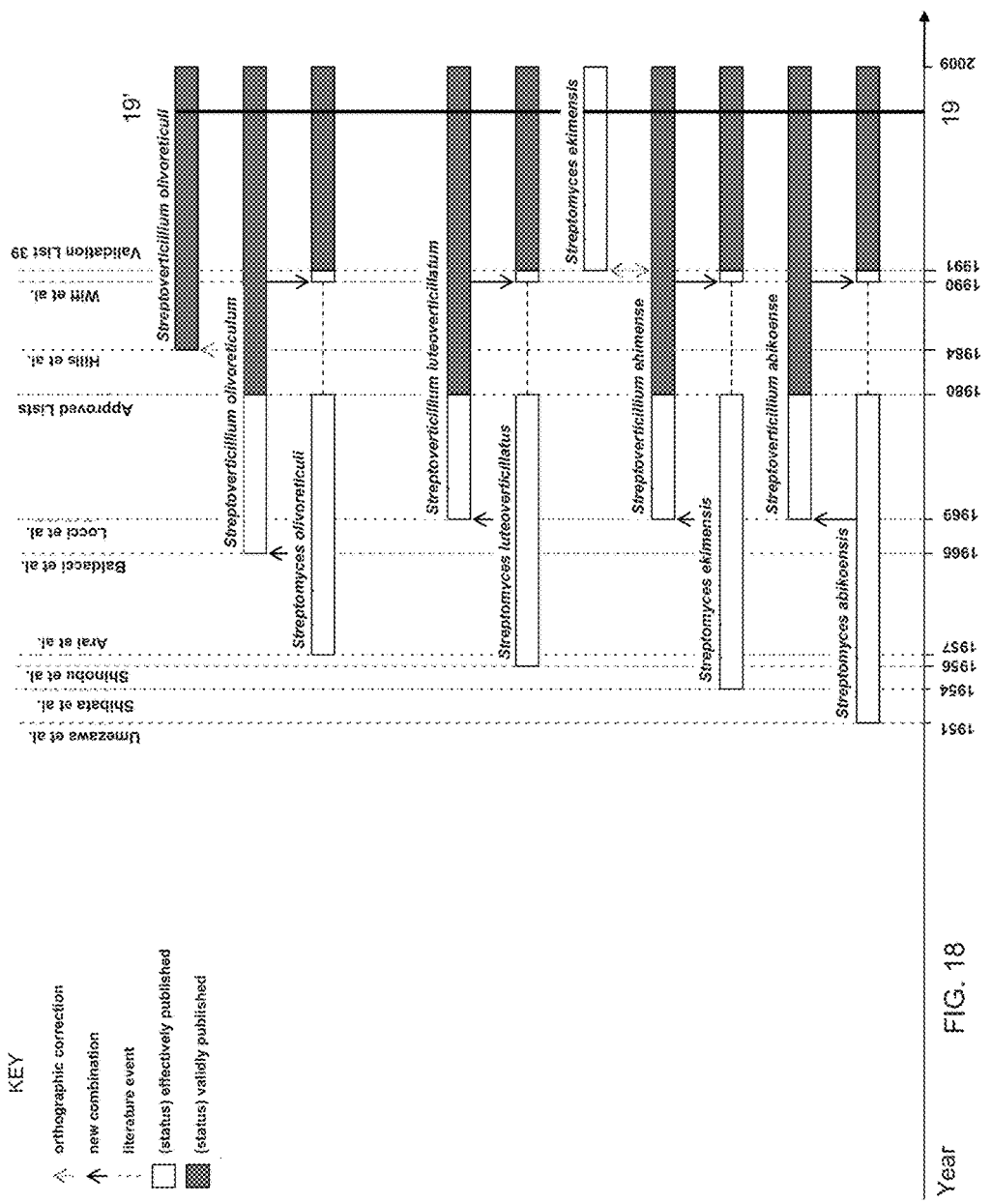
FIG. 18 shows yet another example of a time-based visualization method.

In one embodiment, the computer interface allows a user to pick a point in time at which a taxonomic view is desired, as shown in FIG. 18, by obtaining a selected date from the user, i.e. obtaining from the user the location of a line crossing the time-based axis. A taxonomy diagram is rendered from a single vertical 'slice' of this diagram (line 19-19'), representing a snapshot of the nomenclature at a specific point in time. In various embodiments, the user can select the point in time for producing the taxonomy diagram using any of a number of mechanisms to select a position on the timeline, e.g. by clicking with a mouse or other pointer, sliding a pointer along the timeline, or typing in a date, to name a few possibilities.

Figure 19:
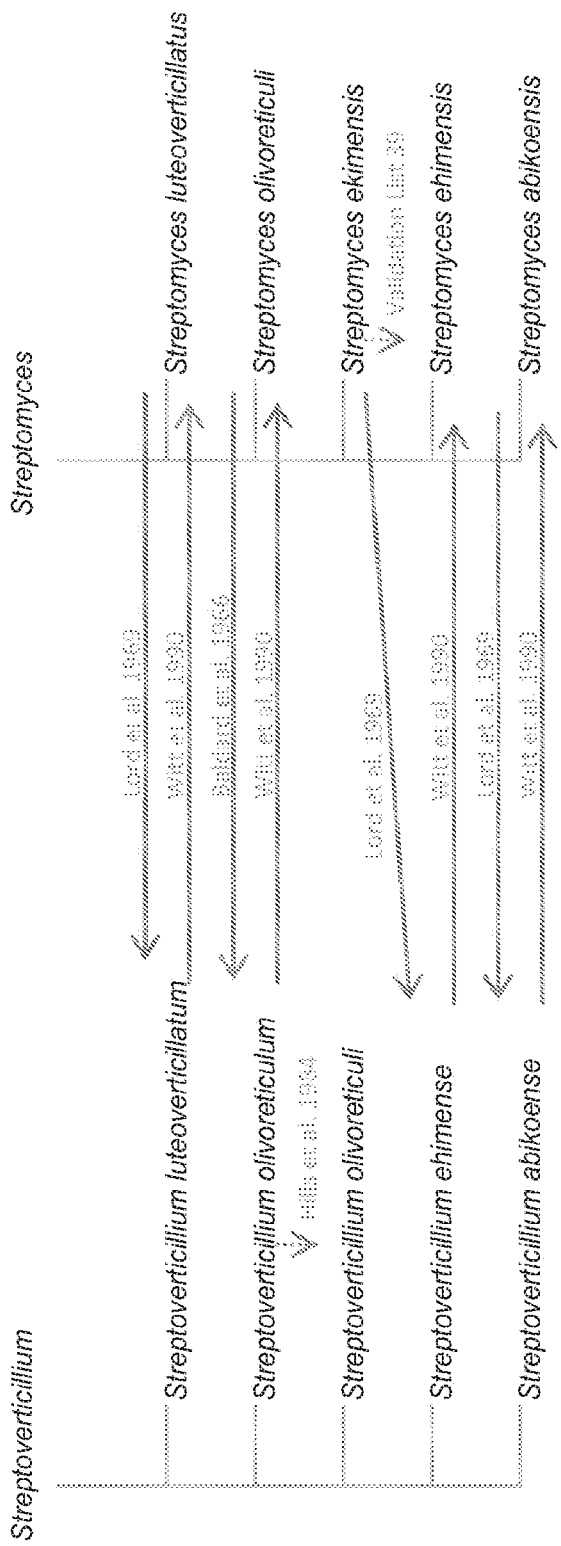
FIG. 19 shows an example of a taxonomic-based visualization method at a the point in time indicated in FIG. 18.

The taxonomy visualization, as shown in FIG. 19, presents a snapshot at a given point in time of all related names and illustrates some of the nomenclatural and taxonomic connections between them. This figure, which was rendered from the underlying N4L database, shows a snapshot of the nomenclature related to *Streptoverticillium* and *Streptomyces* from November 2009. By changing the location of where the vertical line 19-19' crosses the timeline axis in FIG. 18, a taxonomic visualization can be produced for other time points.

Figure 20:
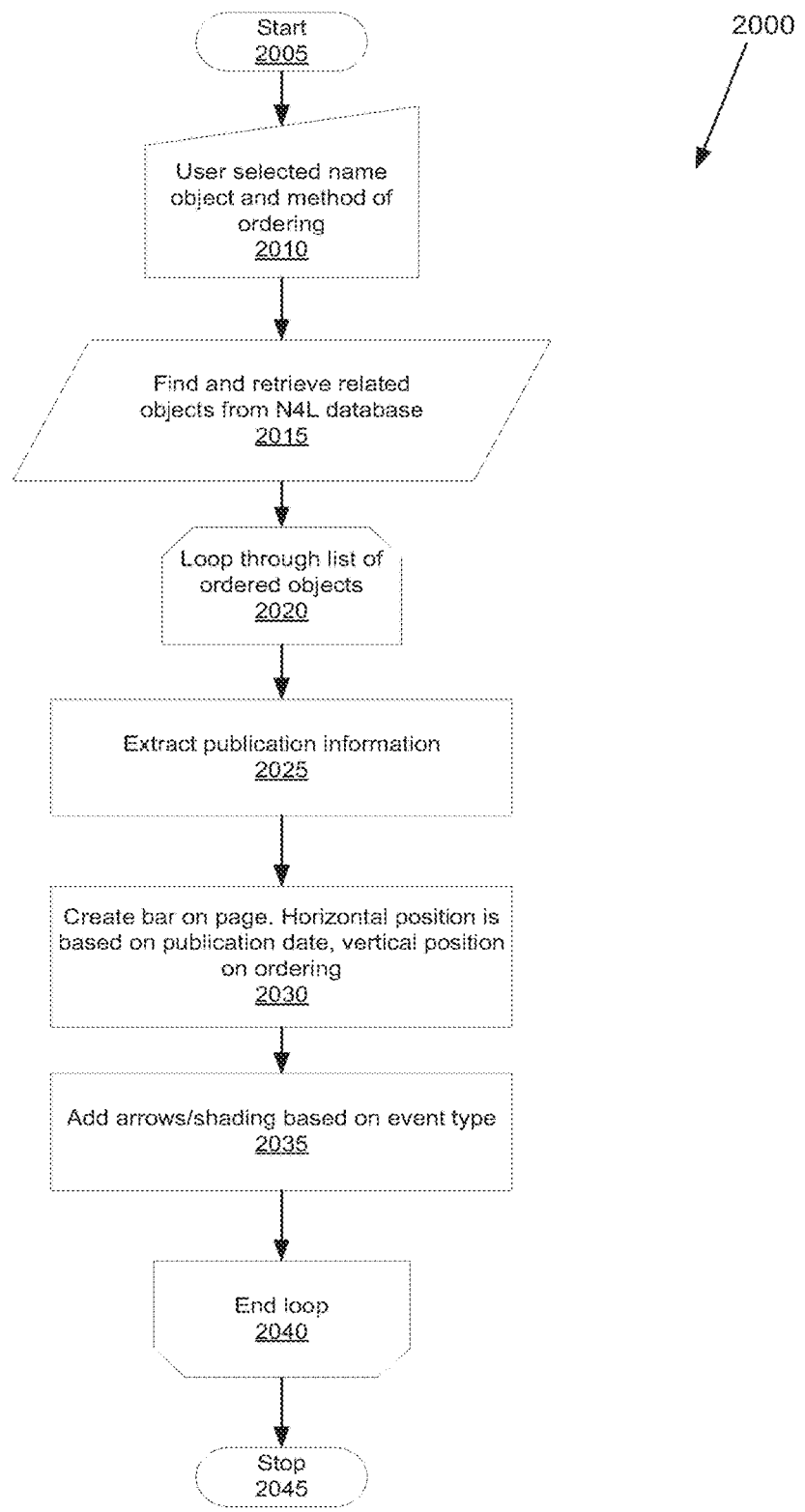
FIG. 20 shows a flow chart of a method for creating a time-based visualization.

With these two visualization methods, a user can better understand the relationships between the information objects and how these relationships change over time. One embodiment of a method 2000 to create these visualizations, using the domain of biological nomenclature as an example, is shown in FIG. 20.

The method 2000 begins at start 2005 with the user selecting both a name object and a method of ordering (ordering basis) 2010. The N4L database is searched and related name objects are retrieved 2015. Relatedness of name objects may be determined in various ways, for example as described by Garrity et al. (US Pat. Appl. Publ. No. 2005/0160059). An ordered, in-memory list is created of all related name objects in the N4L database, which includes various items of time-based publication information including, at a minimum, the publication date of the name object, and the date and type of other key events, such as corrections, change in status, etc. Starting with the selected name object, and looping through all name objects in the list 2020, time-based publication information is extracted 2025 from the selected name object and all related name objects identified in the N4L database. Using the method of ordering (ordering basis) selected by the user, the name objects are sorted into a list order, where the list order is used to determine a relative arrangement of the name objects. Next, a visual indicator such as a bar is created and placed onto the drawing field 2030. The horizontal position of the bar is determined by the publication date extracted in step 2025 and the vertical position is based on the list order. Next, the bar is shaded and arrows are added to indicate the timing and type of the literature events 2035. This process continues until all names in the list have been processed, at which point the loop ends 2040 and the method stops 2045. The result is that an output image such as those shown in FIGS. 16-18 is generated. In the examples shown in FIGS. 16-18, the output images are graphs including the selected name object and the related objects retrieved from the N4L database. The graphs include a time-based axis, such that each of the objects is represented on the graph by a first visual indicator which depicts the time-based publication information extracted for each respective name object. In various embodiments the output image is presented to the user using an output device, for example a computer screen or a printer.

Figure 21:
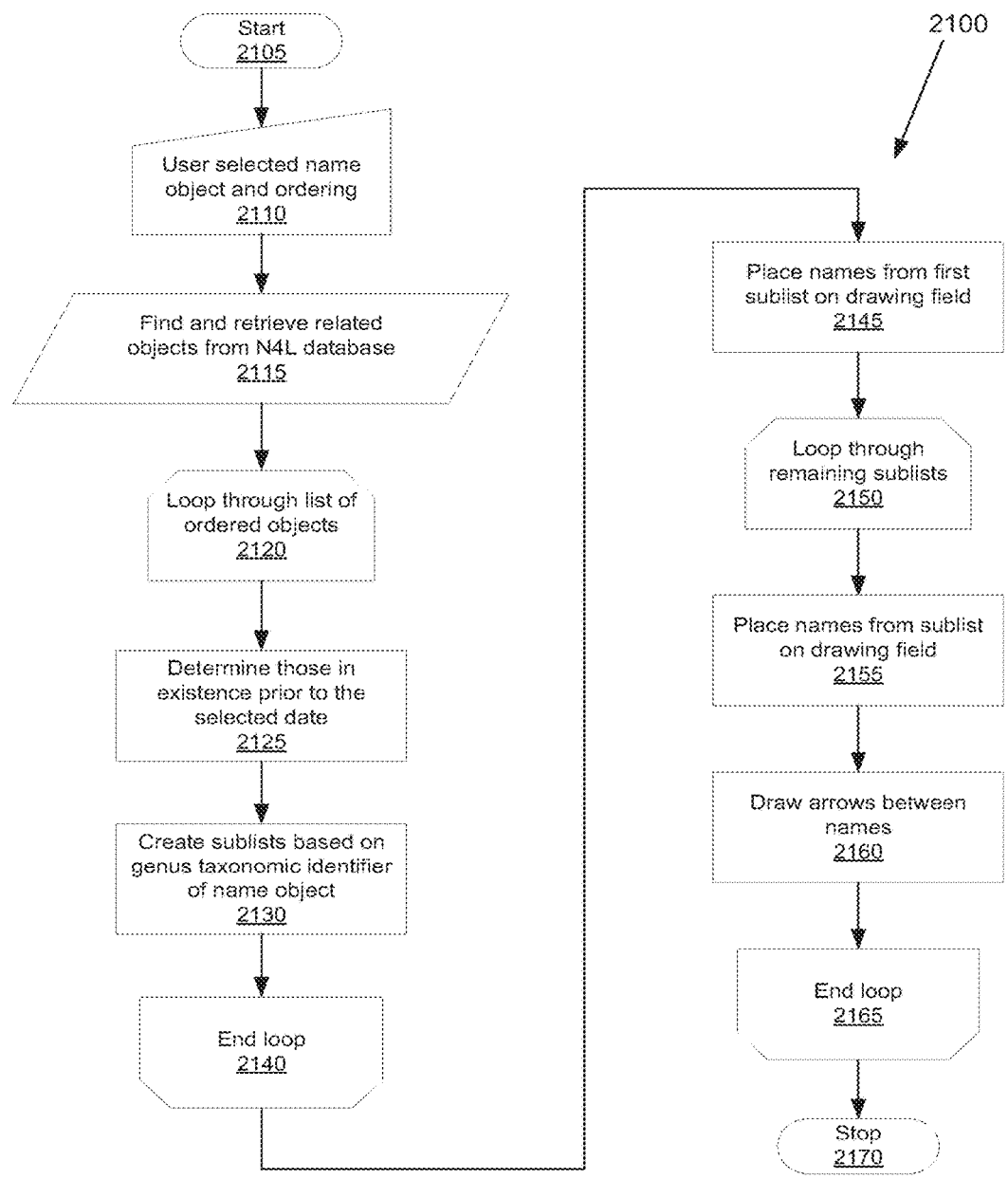
FIG. 21 shows a flow chart of a method for creating a taxonomic-based visualization.

FIG. 21 presents an embodiment of a method 2100 for creating a taxonomy visualization such as that shown in FIG. 19, which is generated in response to a user selecting a date defining a point in time, e.g. by identifying the position of the vertical line, as shown for example in FIG. 18. The vertical line in FIG. 18 intersects all objects in the system at the selected point in time, allowing for the creation of a view containing the set of intersected objects and their state at the specified time. This embodiment describes a case wherein the name objects are biological species, however, the name objects can be of any type previously disclosed. Associated with each object is a taxonomic rank, for example a subspecies, a species, a subgenus, a genus, a family, a tribe, a suborder, an order, a division, a subclass, a class, a subphylum, a phylum, a superphylum, a kingdom, or a domain. As discussed below, the taxonomic rank may be used to form sublists of the objects.

The method 2100 starts 2105 by obtaining a user-selected name object and method of ordering 2110 and finding and retrieving related objects from the N4L database 2115 to produce an ordered, in-memory list of all related names. The next step is to loop through the ordered, in-memory list of all related names 2120 to determine which ones were in existence as of the date corresponding to the vertical line, i.e. as of the selected date obtained from the user 2125. Next, a number of sublists are formed or created 2130 based on, e.g., the taxonomic ranks associated with the objects, after which this initial loop ends 2140. In the illustrated example, each sublist contains the names of a single genus, as can be seen in the two 'columns' of names shown in FIG. 19. Starting with the sublist which contains the name originally selected by the user, the names are placed into the drawing field 2145. Once the first list is completed, the remaining lists are looped through 2150 and sorted according to taxonomic rank, as above, and names from the sublists are placed onto the drawing field 2155. To facilitate understanding, the subsequent lists may be ordered to align related names in the subsequent sublists with the names from the first sublist.

Next, visual indicators such as arrows are drawn to shown synonym events and new combination events 2160. These horizontally-drawn arrows correspond to the dashed vertical lines shown in FIGS. 17 and 18. The arrows may be optionally labeled with an identifier to indicate the associated literature event. After the loop ends 2165, the method stops 2170.

Various known methods can be used to create the visualization on a computer system in accordance with the embodiments disclosed herein. One such method for transforming the data into a graphical representation employs the Java programming language and is presented within the context of a web browser, although other methods can be used as well. One or more visualization figures can be displayed in a single window or in multiple windows.

Additional meta information and inferences about the data can be determined using certain aspects of the current invention. As described above, each time a name-like-string in a digital resource is found in the N4L database 14, a record of that name's (information object's) presence in the digital resource is noted in the N4L-CI database 14. Other information, such as the number of times the name (information object) occurs in a digital resource and/or the number of times an information object is accessed, can also be stored in the N4L-CI database 14. By acting on the data stored in the N4L-CI database 14, additional information can be extracted.

Tracking the number of times an information object is accessed can be useful for certain end-users. To compile these data, a computer process can count the number of requests being made for all names (information objects). Each time a N4L-enabled page is loaded, requests for N4L-enhancement for each identified name in the digital resource are sent to the N4L Server 12, which provides the means for performing the count. This count can include the number of requests ever made for the name or the number of requests which have been made in some period of time. This information can be used to calculate the average number (and standard deviation) of requests per time period for each name. Should the average count value for a name (or a group of closely related names per the network described above) change significantly, this change can be noted. In one embodiment, "change significantly" means a difference which is greater than three-tenths of a standard deviation, although other levels of change are also possible. Examples of responses to changes in name request frequency include notifying one or more BRCs that there may be additional demand for a specific item, notifying one of more suppliers of reagents that there may be additional demand for a specific item, and notifying law enforcement agencies of changing patterns.

Examples of inferences which can be extracted from the data stored in the N4L-CI database 14 include identifying publications focused on similar topics, identifying authors working in similar fields, and discovering heretofore unrecognized relationships between objects. While there are numerous methods known in the art for extracting such inferences, in one embodiment, the first step is to create a graph which links all of the digital resources stored within the N4L-CI database 14 to each other using a distance metric. This is done by calculating a distance metric for each pair of digital resources in the N4L-CI database 14. The distance metric is a numerical value calculated by a mathematical formula which determines the proximity, or relatedness, of the digital resources to each other based on the number and strength of shared concepts. A distance metric may produce either smaller or larger values to indicate closer proximity, i.e., that the two digital resources are more closely related to each other. Graph analysis techniques, which use either smaller or larger values to indicate closer proximity, are known in the art.

The following are examples of distance metrics, but this method is not limited by these embodiments.

In one class of metrics, so-called symmetric metrics, the distance from digital resource 1 to digital resource 2 is the same as the distance from digital resource 2 to digital resource 1. Such a metric can be calculated by counting the number of names (information objects) shared by the two digital resources divided by the total number of unique names that appear in both digital resources. Given S1, the set of all names in digital resource 1, and S2, the set of all names in digital resource 2, then an example distance metric is given by:

$$d = \frac{|S_1 \cap S_2|}{|S_1 \cup S_2|}$$

An example of the use of this distance metric is graphically depicted in FIG. 22. The N4L CI 14 database is comprised of six digital resources, each with some number of names 2205 (FIG. 22A). Using the above algorithm, the distance between each of the digital resources is calculated and displayed in tabular form 2210 (FIG. 22B). For purposes of visualization, the tabulated distances can be represented as a graph, in which the line between nodes shows the strength of the relationship between the digital resources, 2215 (FIG. 22C).

Another possible symmetric metric is the summation of the number of times a name appears in both digital resources divided by the total number of name instances in both digital objects. Another possible distance metric is based on the mutual occurrence of uncommon names, where "uncommon" is defined in one embodiment as "occurring in less than 1% of all digital resources in the N4L-CI database".

In another class of metrics, so-called asymmetric metrics, the distance from digital resource 1 to digital resource 2 is potentially different from the distance from digital resource 2 to digital resource 1. Such a metric can be calculated by counting of the number of names (information objects) shared by the two digital resources. Then, the distance from digital resource 1 to digital resource 2 is given by the number of shared names divided by the total number of unique names in digital resource 1; and the distance from digital resource 2 to digital resource 1 is given by the number of shared names divided by the total number of unique names in digital resource 2:

$$d_{1\to2} = \frac{|S_1 \cap S_2|}{|S_1|}, d_{2\to1} = \frac{|S_2 \cap S_1|}{|S_2|}$$

Once the graph is built, any of a variety of algorithms known to those of ordinary skill, can be used to analyze it. For example, a clustering algorithm, such as that by Zahn (Zahn, C. T. (1971) "Graph-theoretical methods for detecting and describing Gestalt clusters," IEEE Transactions on Computers, C 20, 68-86), can be used to identify groups of articles which address similar subject matter. For the example shown in FIG. 22, such an algorithm would identify two distinct clusters of digital resources. This functionality could be monetized by offering to provide to users references to these other digital resources, thereby saving them from having to review them. Using the Practitioner field stored in an information object, a clustering algorithm could also identify researchers who are working in similar fields (i.e. the 'discovery of research networks'). This information is of value for researchers (to identify potential collaborators and/or competitors), employment agencies, and other individuals or entities. These are but two illustrative examples of how the graph can be used to extract metadata from the system.

Figure 23:
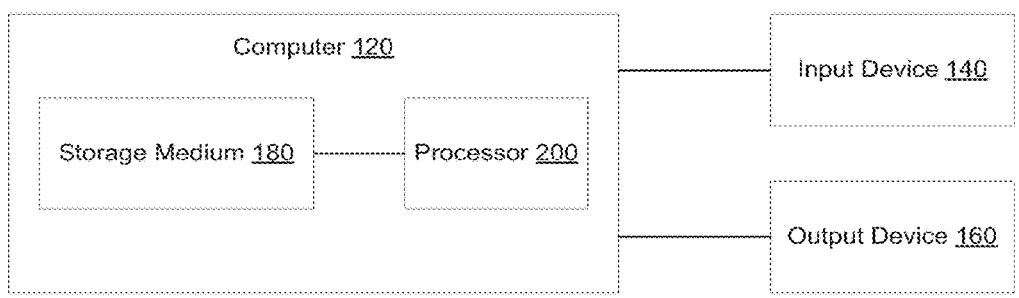
FIG. 23 shows a diagram of a computer that can be used to implement embodiments of the invention.

In various embodiments, the present invention is implemented on one or more computers 10, 12, 14, 16, 32, and 38, see FIGS. 1, 2, and 4. In those embodiments in which more than one computer is used, the computers may be in operative communication with one another through a variety of wired or wireless mechanisms, or through physical transfer of computer-readable media among the computers. The computers may be in communication via a local-area network (LAN) and/or via the Internet or other large-scale computer network. As shown in FIG. 23, each computer 120 may have an input device 140, an output device 160, a storage medium 180, and a processor 200. Possible input devices 140 include a keyboard, a computer mouse, a touch screen, and the like. Output devices 160 include a cathode-ray tube (CRT) computer monitor, a liquid-crystal display (LCD) computer monitor, printer, and the like. Storage media 180 include various types of memory such as a hard disk, RAM, flash memory, and other magnetic, optical, physical, or electronic memory devices, whether fixed or removable. The processor 200 is any computer processor capable of performing calculations and directing other functions for performing input, output, calculation, and display of data in the disclosed invention. Various embodiments of the invention are implemented as a set of instructions and data that are stored on the storage media 180 of one or more computers. In various embodiments, one or more steps of the claimed methods may be executed using the processor 200. In various embodiments, the invention may include a computer program product including a computer usable medium (e.g. storage media 180 as described above) having a computer readable program code embodied thereon, where the computer readable program code is adapted to be executed (e.g. using a processor 200) to implement methods of the invention.

In various embodiments, the present invention can be used in conjunction with a database such as that described by Garrity et al. (US Pat. Appl. Publ. No. 2005/0160059).

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for adding tags to a first digital resource, the method comprising:
   building a graph of information objects retrieved from a database, wherein
      each information object comprises structured text, data, and metadata representing an entity in digital form, said entity being one of: name, taxon, exemplar, practitioner, or nomos,
      each information object is identified by at least one persistent globally unique identifier, wherein said persistent globally unique identifier resolves to a service or a second digital resource encoding said structured text, data, and metadata for said information object,
      said graph comprises a set of information objects and relations among said information objects, each relation linking a pair of information objects,
         each said pair comprising entities of type: name-name, name-taxon, taxon-taxon, taxon-exemplar, exemplar-exemplar, nomos-taxon, practitioner-name, practitioner-taxon, practitioner-exemplar, or practitioner-nomos, and
         each said pair including a relation representing one of: synonymy, homonymy, orthographic variation, equivalence, membership, supertype, or subtype,
      new relations among said information objects are inferred based on a set of encoded rules, and
      the information objects in said graph may be traversed over said relations;
   searching within parsed data of a first digital resource for occurrences of name-like-strings, comprising at least one of the following steps
      searching within the parsed data for specialized formatting,
      searching within the parsed data for a string satisfying a regular expression, analyzing the parsed data using a grammar constructed for a class of name, performing a text search within the parsed data against a reference list of names, or performing a text search within the parsed data to identify a string having at least one of a known prefix or suffix used in a terminology, for each name-like-string identified in the parsed data:
- creating a first structure metadata marking an exact location in the parsed data of the occurrence of said name-like-string,
- obtaining a first persistent globally unique identifier of an information object by matching said name-like-string against the names or labels of entities, wherein said entities are represented as information objects stored in a repository, and wherein each information object is identified by a unique identifier,
- retrieving a first information object from said graph, wherein said first persistent globally unique identifier is identical to a second persistent globally unique identifier that identifies said first information object;
- analyzing said graph, wherein the analysis
  - traverses said graph from said first information object over said relations to identify a plurality of information objects related to said first information object, and
  - retrieves a second information object from among the information objects comprising said graphs;
- obtaining from said second information object a third persistent globally unique identifier,
- adding said third persistent globally unique identifier to said first structured metadata,
- modifying said first digital resource by inserting said first structured metadata at said exact location in the parsed data of the first digital resource.

2. The method of claim 1, wherein said identifier is at least one of a Digital Object Identifier (DOI), a Handle, a Uniform Resource Identifier (URI) or a Uniform Resource Name (URN), an Archival Resource Key (ARK), a Persistent Uniform Resource Locator (PURL), a Universal Unique Identifier (UUID), a Globally Unique Identifier (GUID), and a Life Sciences Identifier (LSID).

3. The method of claim 1, wherein said digital resource includes a computer-storable item selected from the group consisting of: scientific, technical, and medical (STM) literature, patents, Biological Resource Center (BRC) databases, legal literature, diagnostic machinery databases, contracts, treaties, material transfer agreements, prior informed consent agreements, certificates of origin, other documents establishing provenance, bills of lading, shipping documents, specification sheets, interactive graphics, and regulations or laws as applied to holding, transportation, or working with an organism.

4. A system configured to carry out the method of claim 1, wherein the system comprises a plurality of computers, each with software, with the computers communicating via an electronic medium and each performing part of the overall process.

5. The method of claim 1, wherein said first digital resource is a web page and said first structured metadata conforms to an HTML specification.

6. The method of claim 5, wherein said first structured metadata is associated with an actionable service, and
- said first structured metadata is an active region that responds to End-User behavior,
- said actionable service is invoked as a result of End-User activity and
- said actionable service uses said third persistent globally unique identifier to retrieve additional content from a remote server and
- said additional content is presented to said End-User.

7. The method of claim 6, wherein said additional content comprises additional actionable services.

8. The method of claim 1, wherein said first digital resource is a Document Object Model and said first structured metadata comprises a set of Document Object Model nodes.

9. The method of claim 1, wherein said first digital resource is an XML document and said first structured metadata comprises well-formed XML.

10. The method of claim 1, wherein said first digital resource conforms to Open Office XML format and said first structured metadata conforms to Open Office XML format.

11. The method of claim 1, wherein said first structured metadata comprises additional data from one or more information objects.

* * * * *